United States Patent
Gupta et al.

(10) Patent No.: US 9,936,508 B2
(45) Date of Patent: Apr. 3, 2018

(54) MECHANISMS FOR ASSOCIATION REQUEST SIGNALING BETWEEN IOE DEVICES

(71) Applicant: QUALCOMM Incorporated, San Diego, CA (US)

(72) Inventors: Piyush Gupta, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 15/066,625

(22) Filed: Mar. 10, 2016

(65) Prior Publication Data

US 2016/0270056 A1     Sep. 15, 2016

Related U.S. Application Data

(60) Provisional application No. 62/132,665, filed on Mar. 13, 2015, provisional application No. 62/217,422, filed on Sep. 11, 2015.

(51) Int. Cl.
*H04W 72/04* (2009.01)
*H04W 4/00* (2018.01)
(Continued)

(52) U.S. Cl.
CPC .......... *H04W 72/048* (2013.01); *H04L 67/12* (2013.01); *H04W 4/005* (2013.01); *H04W 48/10* (2013.01);
(Continued)

(58) Field of Classification Search
CPC ... H04W 72/048; H04W 4/005; H04W 48/10; H04W 72/0446; H04W 72/0453
See application file for complete search history.

(56) References Cited

U.S. PATENT DOCUMENTS 8,503,377 B2    8/2013 Cordeiro et al.
8,687,539 B2    4/2014 Tay et al.
(Continued)

FOREIGN PATENT DOCUMENTS

WO    WO-2014153770 A1    10/2014

OTHER PUBLICATIONS

3GPP TR 23.703 : "3rd Generation Partnership Project; Technical Specification Group Services and System Aspects; Study on architecture enhancements to support Proximity-based Services (ProSe)", Version 1.1.0, Release 12, Jan. 2014, pp. 348.
(Continued)

*Primary Examiner* — Ronald B Abelson
(74) *Attorney, Agent, or Firm* — QUALCOMM IP Dept.; James Hunt Yancey, Jr.

(57) ABSTRACT

IoE devices signal association requests to relay devices during association slots. An IoE device receives a discovery broadcast from a relay device, listing available tones for association. The IoE device sends a first association request to the relay device using a tone selected from the list. The relay device returns a first response. The IoE device randomly selects a tone from a channel and sends a second request to the relay device with it. A second response is sent to the IoE device after contention. The IoE device creates a list of available tones and sends it to the relay device. An overlapping tone is selected. The relay device sends the selected tone to the IoE device for subsequent data communication. If there is no overlap, the relay device may suggest available tones for use in a subsequent association request. Other aspects, embodiments, and features are also claimed and described.

27 Claims, 8 Drawing Sheets

(51) Int. Cl.
  *H04W 48/10*    (2009.01)
  *H04L 29/08*    (2006.01)
(52) U.S. Cl.
  CPC ... *H04W 72/0446* (2013.01); *H04W 72/0453* (2013.01)

(56) References Cited

U.S. PATENT DOCUMENTS

| | | | |
|---|---|---|---|
| 2009/0036052 A1 | 2/2009 | Miyanaga et al. | |
| 2009/0061767 A1 | 3/2009 | Horiuchi et al. | |
| 2010/0177756 A1* | 7/2010 | Choi | H04W 72/042 370/338 |
| 2011/0249195 A1 | 10/2011 | Teranuma | |
| 2011/0256828 A1 | 10/2011 | Hsu et al. | |
| 2012/0134395 A1* | 5/2012 | Varadarajan | H04B 3/542 375/220 |
| 2013/0111044 A1* | 5/2013 | Cherian | H04L 65/1066 709/228 |
| 2014/0023053 A1 | 1/2014 | Park et al. | |
| 2014/0044036 A1 | 2/2014 | Kim et al. | |
| 2014/0056210 A1 | 2/2014 | Jafarian et al. | |
| 2014/0056220 A1 | 2/2014 | Poitau et al. | |
| 2014/0112162 A1 | 4/2014 | Tavildar et al. | |
| 2015/0016359 A1 | 1/2015 | Wang et al. | |
| 2015/0029866 A1 | 1/2015 | Liao et al. | |
| 2015/0031353 A1 | 1/2015 | Hakola et al. | |
| 2015/0038188 A1* | 2/2015 | Gupta | H04W 24/08 455/510 |
| 2015/0056987 A1 | 2/2015 | Li et al. | |
| 2015/0121470 A1 | 4/2015 | Rongo et al. | |
| 2015/0208332 A1 | 7/2015 | Baghel et al. | |
| 2016/0269486 A1 | 9/2016 | Gupta et al. | |

OTHER PUBLICATIONS

Chuang Y-R., et al., "Study and Implementation of the Smallest Closed-Area (SCA) Mechanism for Self-Organization Network Architectures in Smart Home Control Systems," 17th International Symposium on Consumer Electronics (ISCE), Jun. 3, 2013, pp. 79-80, XP032443881, DOI: 10.1109/ISCE.2013.6570262, ISBN: 978-1-4673-6198-9.
International Search Report and Written Opinion—PCT/US2016/021926—ISA/EPO—May 20, 2016.
International Search Report and Written Opinion—PCT/US2016/020049—ISA/EPO—Jun. 6, 2016.
Joo S-S: "Proposed Resolution LB85 CID284~287; 15-12-0565-00-004k-proposed-resolution-lb85-cid284-287," IEEE SA Mentor; 15-12-0565-00-004k-Proposed-Resolution-LB85-CID284-287, IEEE-SA Mentor, Piscataway, NJ USA, vol. 802.15.4k, Nov. 1, 2012, pp. 1-32, XP068042362, [retrieved on Nov. 1, 2012] pp. 1-29.

* cited by examiner

MECHANISMS FOR ASSOCIATION REQUEST SIGNALING BETWEEN IOE DEVICES

CROSS REFERENCE TO RELATED APPLICATIONS

The present application claims priority to and the benefit of the U.S. Provisional Patent Application No. 62/217,422, filed Sep. 11, 2015, as well as U.S. Provisional Patent Application No. 62/132,665, filed Mar. 13, 2015, which are hereby incorporated by reference in their entirety as if fully set forth below in their entirety and for all applicable purposes.

TECHNICAL FIELD

The technology discussed here relates generally to wireless communication systems, and more particularly, to relay device association by Internet of Everything ("IoE") devices and other wireless communication devices capable of distributed links among one or more multiple relay devices. Certain embodiments can be configured to enable and provide communication (e.g., relay protocols) without explicit resource reservation schemes, with low energy overhead that allows IoE devices to discover potential relays, have efficient routes to base stations/gateways, and use devices to associate and establish one or more links having reasonable energy overhead and latency characteristics.

INTRODUCTION

Devices that can link to other devices, sensors, and computer systems continue to be embedded with more and more devices or objects. This can result in IoE devices that can use a variety of wired and/or wireless communication technologies. Some examples of integration include devices that integrate sensors or meters to capture information that is then relayed to a remote system, such as a central server. This can include smart metering, temperature monitoring, pressure monitoring, fluid flow monitoring, inventory monitoring, water level monitoring, equipment monitoring, healthcare monitoring, wildlife monitoring, weather and geological event monitoring, fleet management and tracking, smart cities, smart driving scenarios, remote security sensing, physical access control, transaction-based business charging, and other applications.

Given their nature, IoE devices are typically designed to consume low amounts of power and generally have low cost. For example, a sensor deployed in a gas meter (resulting in a "smart meter") may be expected to last years without replacement or recharge (if recharging is even possible). Some IoE devices can have significantly higher path loss to the base station/gateway than other IoE devices. This can be caused by severe shadowing and/or device placement (e.g., an IoE device in the basement of a building). Further, often IoE devices are expected to have little or no mobility, which means that IoE devices with higher path loss can be stuck with it. This can result in diminished battery life of the corresponding IoE devices in comparison to other devices in the network, requiring frequent battery replacement and/or degrading network performance.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One approach to address the above issue is to allow IoE devices to relay their uplink traffic via a nearby device (e.g., another IoE device or a user equipment with better path loss and/or power budget characteristics). Due to limited power availability, most IoE devices are likely to be in a sleep mode most of the time. Once an IoE device has discovered and selected a potential relay device, the IoE device seeks to associate with the potential relay device. Difficulties may arise, however, due to the fact that the IoE device does not have a reserved set of resources with which to communicate with the potential relay device. As a result, there is a room for techniques to allow an IoE device to associate with a selected relay device that enables the devices to arrive at a set of resources for use during data transmission while still limiting the amount of power and latency imposed on the IoE device to perform such functions (i.e., a multi-round contention resolution procedure).

In one aspect of the disclosure, a method is provided that includes transmitting, from a first wireless communication device to a second wireless communication device, a first association request during a reserved time slot of a data frame using a first tone available for an association request. The method further includes selecting, by the first wireless communication device, a second tone based on a first response from the second wireless communication device to the first association request during the reserved time slot. The method further includes transmitting, from the first wireless communications device to the second wireless communication device, a second association request during the reserved time slot of the data frame using the second tone.

In an additional aspect of the disclosure, a method is provided that includes receiving, at a first wireless communication device from a second wireless communication device, a first association request during a reserved time slot of a data frame on a first tone available for an association request. The method further includes transmitting, from the first wireless communication device to the second wireless communication device, a first response to the first association request during the reserved time slot of the data frame. The method further includes receiving, at the first wireless communication device from the second wireless communication device, a second association request during the reserved time slot of the data frame using a second tone.

In an additional aspect of the disclosure, an apparatus is provided that includes a transceiver configured to transmit, to a wireless communication device, a first association request during a reserved time slot of a first data frame using a first tone available for an association request. The apparatus further includes a processor configured to select a second tone based on a first response from the second wireless communications device to the first association request during the reserved time slot of the data frame. The apparatus further includes wherein the transceiver is further configured to transmit, to the wireless communication device, a second association request during the reserved time slot of the data frame using the second tone.

In an additional aspect of the disclosure, an apparatus is provided that includes a transceiver configured to receive, from a wireless communication device, a first association request during a reserved time slot of a data frame on a first tone available for an association request. The apparatus further includes a processor configured to generate a first response to the first association request during the reserved time slot of the data frame. The apparatus further includes wherein the transceiver is further configured to transmit the first response to the wireless communication device and receive, from the wireless communication device, a second association request during the reserved time slot of the data frame using a second tone.

In an additional aspect of the disclosure, a computer readable medium having program code recorded thereon is provided, the program code including code for causing a first wireless communication device to transmit, to a second wireless communication device, a first association request during a reserved time slot of a data frame using a first tone available for an association request. The program code further includes code for causing the first wireless communication device to select a second tone based on a first response from the second wireless communication device to the first association request during the reserved time slot. The program code further includes code for causing the first wireless communication device to transmit, to the second wireless communication device, a second association request during the reserved time slot of the data frame using the second tone.

In an additional aspect of the disclosure, a computer readable medium having program code recorded thereon is provided, the program code including code for causing a first wireless communication device to receive, from a second wireless communication device, a first association request during a reserved time slot of a data frame on a first tone available for an association request. The program code further includes code for causing the first wireless communication device to transmit, to the second wireless communication device, a first response to the first association request during the reserved time slot of the data frame. The program code further includes code for causing the first wireless communication device to receive, from the second wireless communication device, a second association request during the reserved time slot of the data frame using a second tone.

In an additional aspect of the disclosure, an apparatus is provided that includes means for transmitting, from the apparatus to a wireless communication device, a first association request during a reserved time slot of a data frame using a first tone available for an association request. The apparatus further includes means for selecting, by the apparatus, a second tone from among a plurality of available tones based on a first response from the wireless communication device to the first association request during the reserved time slot. The apparatus further includes means for transmitting, from the apparatus to the wireless communication device, a second association request during the reserved time slot of the data frame using the second tone.

In an additional aspect of the disclosure, a network system includes means for receiving, at the apparatus from a wireless communication device, a first association request during a reserved time slot of a data frame on a first tone available for an association request. The apparatus further includes means for transmitting, from the apparatus to the wireless communication device, a first response to the first association request during the reserved time slot of the data frame. The apparatus further includes means for receiving, at the apparatus from the wireless communication device, a second association request during the reserved time slot of the data frame using a second tone.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
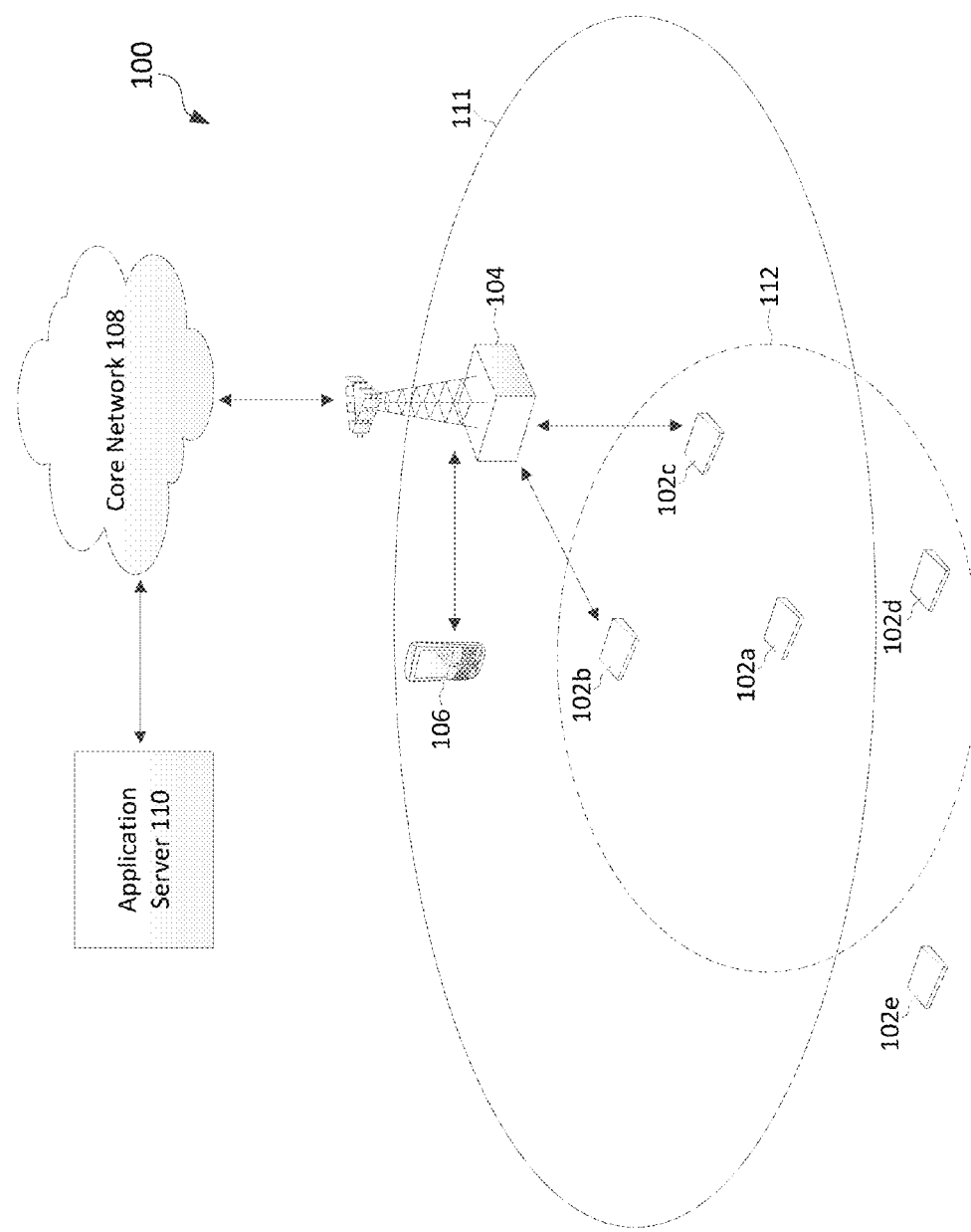
FIG. 1 illustrates an exemplary wireless communication environment according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA, LTE networks, GSM networks, and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5th Generation (5G)) network.

Further, devices may also communicate with one another using various peer-to-peer technologies such as LTE-Direct (LTE-D), Bluetooth, Bluetooth Low Energy (BLE), ZigBee, radiofrequency identification (RFID), and/or other ad-hoc or mesh network technologies. Embodiments of this disclosure are directed to any type of modulation scheme that may be used on any one or more of the above-recited networks and/or those yet to be developed.

Embodiments of the present disclosure introduce systems and techniques to enable devices, such as IoE devices, to signal association requests to other devices suitable to be (and available as) relay devices. Relay devices can be IoE devices as well. In an embodiment, a candidate relay device may select a set of tones that may be used for association requests in a discovery broadcast. An IoE device receives the discovery broadcast and selects a tone (or multiple tones or other indicators) from the set. The IoE device initiates a first round of contention resolution with the relay device by sending a first association request to the relay device using the selected tone during an association slot of a data frame. This first request can be used at the relay device to resolve contention among multiple possible relay devices. If the contention is resolved in the relay device's favor, it sends a first association response message to the requesting IoE device.

At this point, the requesting IoE device may not yet have an assigned set of resources with which to communicate data to the relay device during a data slot of a data frame. As a result, the requesting IoE device can initiate a second round of contention resolution. The IoE device randomly selects a tone from among a large or full width of the channel. The IoE device can then use this randomly selected tone to send a second association request to the relay device. The relay device selects a requesting device from among however many devices seek relay service (e.g., at that time), and sends a second association response to the selected requesting IoE device (e.g., after contention). Now that the relay device has agreed to provide relay service to the requesting IoE device, the IoE device creates a list of available tones in its neighborhood and sends that in an association data message to the relay device.

If there is overlap with one or more tones available in a neighborhood of the relay device, the relay device selects an overlapping tone. The relay device sends the tone selected to be a connection identifier ("CID") between the relay device and the IoE device to the IoE device. The IoE device will then use that selected CID in future data communications in a data frame. If there is no overlap, the relay device may instead search for one or more tones that are available during a data slot of a data frame (e.g., tones not already assigned/used by other devices) within the relay device's neighborhood. The relay device may include these identified tones in a communication to the IoE device. The IoE device then attempts to associate with the relay device again at a subsequent time, this time relying on the identified tones from the relay device to suggest a CID that both devices may agree upon.

FIG. 1 is a diagram of an exemplary wireless communications environment 100 according to embodiments of the present disclosure. The communications environment 100 may include a number of IoE devices 102a-102e, a number of base stations 104, a core network 108, and one or more application servers 110. Other components may also be present in the environment 100. Also, the network itself can be a WAN with stationary, semi-static, or dynamic characteristics, a vehicular network, drone network, or cover localized areas. Indeed, with movable components, a surrounding network can be thought of as a mobile network (i.e., a small cell network capable of operations while moving). As discussed below, the environment 100 may also have additional features.

For example, the communications environment 100 may support operation on multiple carriers (e.g., waveform signals of different frequencies). Multi-carrier transmitters can transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. The communications environment 100 may be a multi-carrier LTE network capable of efficiently allocating network resources. And in some scenarios the environment 100 may be a 5G network or a network comprised of several co-existing convergent networks.

For example, in some implementations the wireless network 100 may utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively. Other frequency, code, and/or time division approaches may also be used. The communications environment 100 is one example of a network to which various aspects of the disclosure apply.

The base station 104 may include an evolved Node B (eNodeB or eNB), for example. A base station 104 may also be referred to as a base transceiver station, gateway, or an access point. For purposes of simplicity, reference will be made herein to these as "base stations" as a general term, though it will be recognized that these may be any of the types listed herein. FIG. 1 illustrates a single base station 104 for purposes of simplicity only. It will be recognized that there could be two or more base stations, as well as be an assortment of different types such as macro, pico, and/or femto base stations and/or other devices that include at least some capabilities of a base station. The base stations 104 may communicate with the application server 110 via a backhaul such as core network 108. The base station 104 may also communicate with other base stations, directly or indirectly, such as via core network 108.

The IoE devices 102 may be dispersed throughout the communications environment 100, and each IoE device 102 may be stationary or mobile. One or more of the IoE devices 102 may also be referred to as "internet of things" (IoT) devices with corresponding functionality; reference will be made herein to IoE devices for simplicity of discussion. FIG. 1 illustrates IoE devices 102a-102e for purposes of simplicity of illustration only. More or fewer may be deployed within the communications environment 100 as will be understood to those skilled in the relevant art(s). IoE devices 102a-102e may either be stand-alone or integrated within other devices. The IoE devices 102 may capture information that is then relayed to a remote system, such as application server 110 in FIG. 1. IoE devices 102 may have limited power resources because they are integrated with devices or objects, such as to render those devices or objects "smart," and may need to be able to operate for long periods of time without replacement or recharge, e.g. days, weeks, months, or years.

As a result, IoE devices 102 with limited transmit power, high path loss, and/or other constraints may discover and utilize another IoE device 102 as a relay to the base station 104, as discussed in greater detail below, in order to decrease power consumption. As used herein, a relay may be a station that receives a transmission of data and/or other information from an upstream station (e.g., a base station 104, a UE 106, or the like) and sends a transmission of the data and/or other information to a downstream station (e.g., another IoE device 102, a base station 104, or the like). A relay may also be referred to as a relay IoE device, a relay base station, a relay UE, a relay, and the like.

The wireless network 100 may also include one or more user equipments (UEs) 106 that may be dispersed throughout the wireless network 100 and can be either stationary or mobile. The UE 106 may also be referred to as a terminal, a mobile station, a subscriber unit, etc. The UE 106 may be a cellular phone, a smartphone, a personal digital assistant, a wireless modem, a laptop computer, an entertainment device, a tablet computer, a drone, an entertainment device, a hub, a gateway, an appliance, a wearable, peer-to-peer and device-to-device components/devices (including fixed, stationary, and mobile), IoE devices, IoT devices, and many other wireless communication devices. In some implementations, a UE 106, another base station 104, an access point, or a gateway can serve as a relay to the base station 104 for a particular IoE device 102. In this regard, while the following description will focus on use of another IoE device 102 serving as the relay, it is understood that the concepts are equally applicable to other types of wireless communication devices that can serve as a relay.

The application server 110 may be a central server that the IoE devices 102 are attempting to transmit data to for storage and/or analysis. The application server 110 may receive data as it is conveyed from the base station 104 from one or more of the IoE devices 102 and make use of information from the data and/or present it to one or more users that interact with the application server 110.

The base station 104 may have a sufficiently large coverage area 111 that one or more of the IoE devices 102a-102e and/or UE 106 can receive data from the base station 104, via a downlink. The downlink (or forward link) refers to the communication link from a base station 104 to the IoE devices 102 and/or UEs 106. Although capable of establishing a downlink with a base station 104, in some instances one or more of the IoE devices 102 may not have sufficient power to be able to establish an uplink to a base station 104. The uplink (or reverse link) refers to the communication link from an IoE device 102 (or a UE 106) to a base station 104. Further, in some instances an IoE device 102 may not be able to establish an uplink or a downlink connection with a base station 104 on its own. In such instances, the IoE device 102 may utilize communications with other IoE devices 102 and/or UEs 106 (as relay devices) to facilitate indirect communication with a base station 104. Examples of such indirect communication approaches are described in U.S. patent application Ser. No. 14/107,195, filed Dec. 16, 2013 and titled "A HYBRID RELAY SCHEME," U.S. patent application Ser. No. 14/107,221, filed Dec. 16, 2013 and titled "RELAY SCHEME BETWEEN NARROW FREQUENCY BAND AND BROAD FREQUENCY BAND DEVICES," U.S. Provisional Patent Application No. 62/078,755, filed Nov. 12, 2014 and titled "OPPORTUNISTIC IOE MESSAGE DELIVERY VIA SENSOR-TRIGGERED FORWARDING," and/or U.S. Provisional Patent Application No. 62/078,711, filed Nov. 12, 2014 and titled "OPPORTUNISTIC IOE MESSAGE DELIVERY VIA WAN-TRIGGERED FORWARDING," each of which is expressly hereby incorporated by reference in its entirety.

In FIG. 1, IoE device 102a is shown as having a transmission range represented by area 112. As illustrated, area 112 does not reach base station 104. Accordingly, the IoE device 102a may be required to increase transmission power (if possible) in an effort to communicate directly with base station 104 at least on the uplink, which would adversely affect the power consumption and/or battery lifespan of IoE device 102a. To address this deficiency in range, the IoE device 102 may discover and select another IoE device (e.g., IoE device 102b or 102c) to utilize as a relay to communicate with base station 104 in a manner that conserves power and accounts for any latency parameters of the data to be communicated from IoE device 102a to base station 104, for example as described in U.S. Provisional Patent Application No. 62/132,665, filed Mar. 13, 2015 and titled "INTERNET OF EVERYTHING DEVICE RELAY DISCOVERY AND SELECTION," which is incorporated by reference herein in its entirety.

IoE devices 102 may be capable of linking to, or associating with, each other, for example via device-to-device (D2D) links. In some instances, the IoE devices 102 link to each other by sending out discovery messages and/or listening for discovery messages to determine what other IoE devices 102 may be within a neighboring vicinity (e.g., one, two, or more hops as defined by the specific situation) and/or have sufficient operating parameters to serve as a relay to the base station 104. IoE devices 102 in the network 100 can be time-synchronized with the downlink of a WAN (e.g., cellular network), through either in-band or out-of-band signaling, either directly from the WAN or from a designated base station or gateway. The designated base station or gateway may provide coverage to all of the IoE devices 102 in the network 100 to facilitate synchronization of all of the IoE devices 102. In some implementations, the IoE devices 102 can utilize an external source (e.g., radio transmission of the UTC time by the NIST station in Fort Collins, Colo., or Global Positioning System timing) to derive a common timing for synchronizing discovery frames.

Further, in some instances, the IoE device 102 may not be capable of receiving a WAN signal from the base station 104. For example, many IoE devices 102 are manufactured to be extremely low cost and, therefore, may not include WAN technology. Accordingly, in some implementations another IoE device 102, a UE 106, an access point, a gateway, and/or other wireless communication device can communicate timing information to the IoE device 102 using a specific radio protocol and on a channel associated with the IoE device 102 (e.g., WLAN, Bluetooth, ZigBee, etc.). Regardless of how the IoE device 102 receives the timing, the common timing can be used to send discovery broadcasts and/or listen for discovery broadcasts from the base station 104 and/or other IoE devices 102 at predetermined times and/or periodicity as described in greater detail below.

A newly introduced IoE device 102 to the network 100, or existing IoE device 102 looking for a relay, can utilize one or more discovery frames to learn about the base station 104 and/or other potential wireless communication devices (e.g., other IoE devices, UEs, access points, gateways, base stations, etc.) for relaying to the base station 104. By having a pre-determined, synchronized timing for the discovery frames, an IoE device 102 can perform discovery with minimal energy expenditure by being in the power-save mode until the next discovery frame. For example, FIG. 3A is a diagram of a frame timeline 300 illustrating a discovery frame spacing according to embodiments of the present disclosure.

Figure 3A:
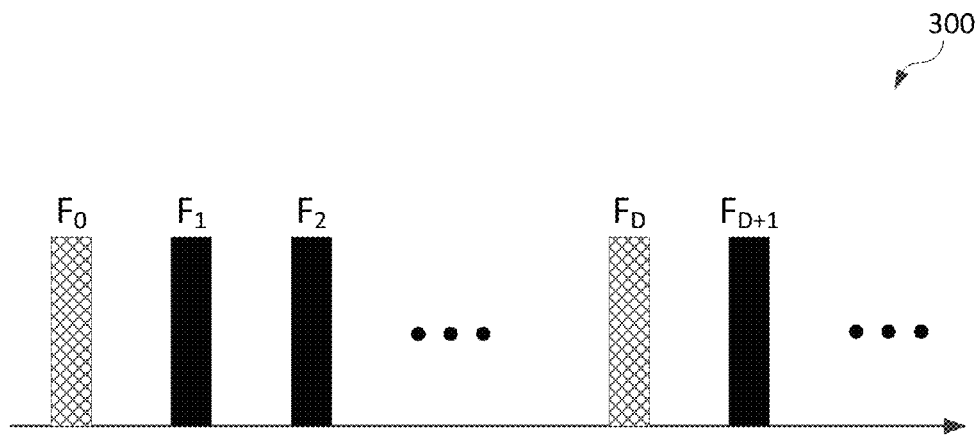
FIG. 3A is a diagram of a frame timeline illustrating a discovery frame spacing according to embodiments of the present disclosure.

As shown in FIG. 3A, discovery frames ($F_0$ and $F_D$) occur at pre-determined times and/or periodicity. The discovery frames ($F_0$ and $F_D$) may be sent at certain times (e.g., based on a reference clock), at certain time intervals (e.g., once per x minutes, hours, days, weeks, months, etc.), at certain frame intervals (e.g., every D frames in the illustrated embodiment), and/or other suitable timing technique. During the discovery frames ($F_0$ and $F_D$), each IoE device 102 in a position to act as a relay broadcasts a discovery message (also referred to herein as a discovery broadcast) that includes information to allow other IoE devices to determine whether it is suitable to serve as a relay for that particular receiving IoE device. For example, the discovery message can include such information as a device ID, an awake schedule, a transmission schedule, a current rate of energy consumption, remaining battery power, the amount energy required to transmit a packet of certain length(s), and/or other information about the transmitting device. As illustrated in FIG. 3A, the discovery broadcasts are sent at pre-determined times and periodicity (illustrated as every D frame periods in FIG. 3A).

Returning to FIG. 1, a newly-introduced IoE device 102 (or existing already within the network) can rely on the information obtained from, and derived from, the discovery broadcasts of other potential relay devices. An exemplary use case will now be described with reference to the exemplary elements in FIG. 1. As illustrated, IoE device 102a may be outside an uplink range of the base station 104, for example due to placement in an area with high path loss and/or other signal degrading characteristics. In contrast, IoE devices 102b and 102c may be within uplink range of the base station 104 due to one or both of closer proximity and better signal characteristics than IoE device 102a.

Figure 3B:
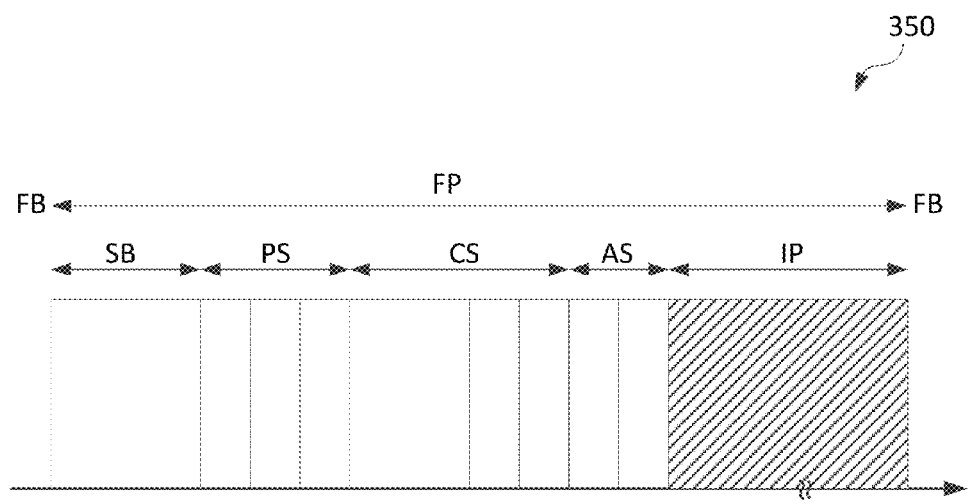
FIG. 3B is a diagram of a frame structure of a data frame according to embodiments of the present disclosure.

To facilitate devices such as the IoE device 102a connecting to the base station 104 for uplink communication, various IoE devices 102 such as the IoE devices 102b and 102c may periodically transmit discovery broadcasts to other IoE devices within their neighborhood. A neighborhood herein may refer to IoE devices that are within a number of hops from each other (e.g., 2 or more or fewer in a given situation). As part of this, focusing on IoE device 102b as a particular example, the IoE device 102b may assess what resources have already been used/assigned for use among those available for regular data communication. This may include, for example one or more tones (frequencies) that may also be referred to herein as "connection identifiers" or "CIDs." In an embodiment, a CID may be directly associated with a particular tone (or tones). In an alternative embodiment, the CID may be randomly assigned to a tone (or tones) during specific time periods. The IoE device 102b may include a subset of those tones in use in its discovery broadcast which other IoE devices, such as IoE device 102a, looking for a relay device may rely upon in attempts to associate with the IoE device 102b. This is feasible because the IoE devices 102 that already have the assigned CIDs will not be using those CIDs for transmission during an association slot of a data frame (since data transmission slots may have already occurred, such as illustrated in FIG. 3B). In alternative embodiments where the IoE device 102b does not relay traffic from other devices yet, the IoE device 102b may monitor the discovery frame (e.g., as described above with respect to FIG. 3A) to identify one or more tones being used in a neighborhood of the IoE device 102b, and select one or more non-utilized tones to include in the discovery broadcast. Either way, these tones represent tones that the IoE device 102b has indicated it will accept association requests on and constitute locally and temporally unique tones to the IoE device 102a.

The IoE device 102b transmits its discovery broadcast, including the subset of tones identified as available for association requests. The IoE device 102a may be within range of the IoE device 102b, and therefore receive the discovery broadcast. Although described with IoE device 102b as a specific example, as will be recognized the IoE device 102a may receive multiple discovery broadcasts from multiple potential relay devices. The IoE device 102a may make a determination as to which device to select to attempt to associate with as a relay device. This determination may be based on different factors/characteristics, for example a measured/reported distance between devices, a received signal strength (e.g., the best signal strength selected), etc. As the IoE device 102a is seeking a relay device, the IoE device 102a may parse out the identified tones from the discovery broadcast. During a data frame (as identified by the discovery broadcast for the IoE device 102b), such as described below with respect to FIG. 3B, there may be one or more slots reserved for association requests ("association slots"). These slots may be reserved expressly for association, such that regular data is not being transmitted or received between IoE devices 102 during that time.

After the IoE device 102a has discovered the IoE device 102b as a potential relay device, the IoE device 102 may go to sleep after the discovery frame is over and wake up again at the next designated data frame (for example, as specified in the discovery broadcast). When the association slot of the data frame begins, the IoE device 102a may select one of the identified tones from the discovery broadcast and send a first association request to the IoE device 102b, which in some embodiments may be a request to send (RTS). Reference will be made herein to this as RTS1 (a first RTS). The RTS1 is sent to the IoE device 102*b* using the identified and selected tone. This corresponds to an increased amount of energy on that selected tone. This first RTS1 may be used to resolve contention across multiple association request-receiving IoE devices, for example within a 2-hop neighborhood. For example, the candidate relay device with the highest priority CID (e.g., the IoE device 102*b* in this example) may win contention during this first round.

The IoE device 102*b*, upon winning contention from this first round, sends a first association response to the IoE device 102*a*, which in some embodiments may be a clear to send (CTS). Reference will be made herein to this as CTS1 (a first CTS). The CTS1 may be sent to the IoE device 102*a* using the same tone as the RTS1 was sent on, for example. As there may have been other IoE devices 102 also attempting to associate with the IoE device 102*b* as a relay device, another round of signaling may be introduced in order to resolve contention among the different IoE devices 102 for the specific IoE device 102*b* as a relay.

When the IoE device 102*a* receives the CTS1, the IoE device 102*a* proceeds with the next round of signaling. The IoE device 102*a* randomly selects a tone from among the full bandwidth of available tones (the full CID block), instead of just from the set identified in the discovery broadcast from the IoE device 102*b*, to use for a second association request. The IoE device 102*a* sends another association request, during the same association slot but at a later symbol time, which may be another RTS (RTS2 herein). The random selection of a CID for the RTS2 may enable the chance of conflict between requesting IoE devices to be reduced, as the number of devices attempting to associate with the same IoE device 102*b* for relay in a given data frame may be small.

When the IoE device 102*b* receives the RTS2 (from one or more IoE devices 102, including the IoE device 102*a*), the IoE device 102*b* proceeds to assess the different RTS2 messages received and select one among them (if there are multiple). This resolves contention from among potentially multiple devices seeking to associate with the IoE device 102*b* as a relay. The IoE device 102*b* sends a second association response to the IoE device 102*a*, referred to herein as a second CTS (CTS2). This indicates that the IoE device 102*b* has accepted to associate with the IoE device 102*a* as a relay, pending agreement on a specific CID for data traffic.

Upon receipt of the CTS2, the IoE device 102*a* prepares association data to send to the IoE device 102*b*. The association data can include a list of one or more candidate tones that the IoE device 102*a* has identified, for example by monitoring discovery broadcasts and/or signaling blocks for tones in use, that are not in use within a neighborhood of the IoE device 102*a*. The IoE device 102*a* sends the association data including the candidate tones (and potentially other data relevant to establishing a connection between the two devices) to the IoE device 102*b*. The IoE device 102*b*, in turn, reviews the candidate tones, compares against the tones in use in the neighborhood of the IoE device 102*b*, and determines whether there are any available tones that overlap with those identified in the candidate tones. If there is overlap, the IoE device 102*b* may select an overlapping tone (e.g., based on priority if there are multiple available) as a CID that will be reserved for the IoE device 102*a* in particular during subsequent data frames.

Once the CID between the IoE device 102*a* and 102*b* is selected, the IoE device 102*b* includes the CID in an acknowledgement (ACK) message and sends the ACK message to the IoE device 102*a*. When the next data frame occurs where the IoE device 102*a* has data to send, it will send that data using the agreed-upon CID to the IoE device 102*b* for the IoE device 102*b* to then relay on to the base station 104. If, however, the IoE device 102*b* cannot find any overlap between the candidate tones and available tones in the neighborhood of the IoE device 102*b*, the IoE device 102*b* may not accept any tone and, therefore, not send an ACK message to the IoE device 102*a*. Instead, the IoE device 102*b* may create a list of one or more tones available in its immediate neighborhood and send those tones in a message to the IoE device 102*a*. As a result, association does not complete in this embodiment. Instead, the IoE device 102*a* may go through another round of association contention (RTS1/CTS1 and RTS2/CTS2) with the IoE device 102*b* as a target relay device. The next time around, the IoE device 102*a* may include one or more tones listed in the last message from the IoE device 102*b* in a new set of association data.

In this manner, a scalable, distributed procedure is described that allows CIDs to be selected without prior knowledge or assignment between IoE devices 102.

Figure 2:
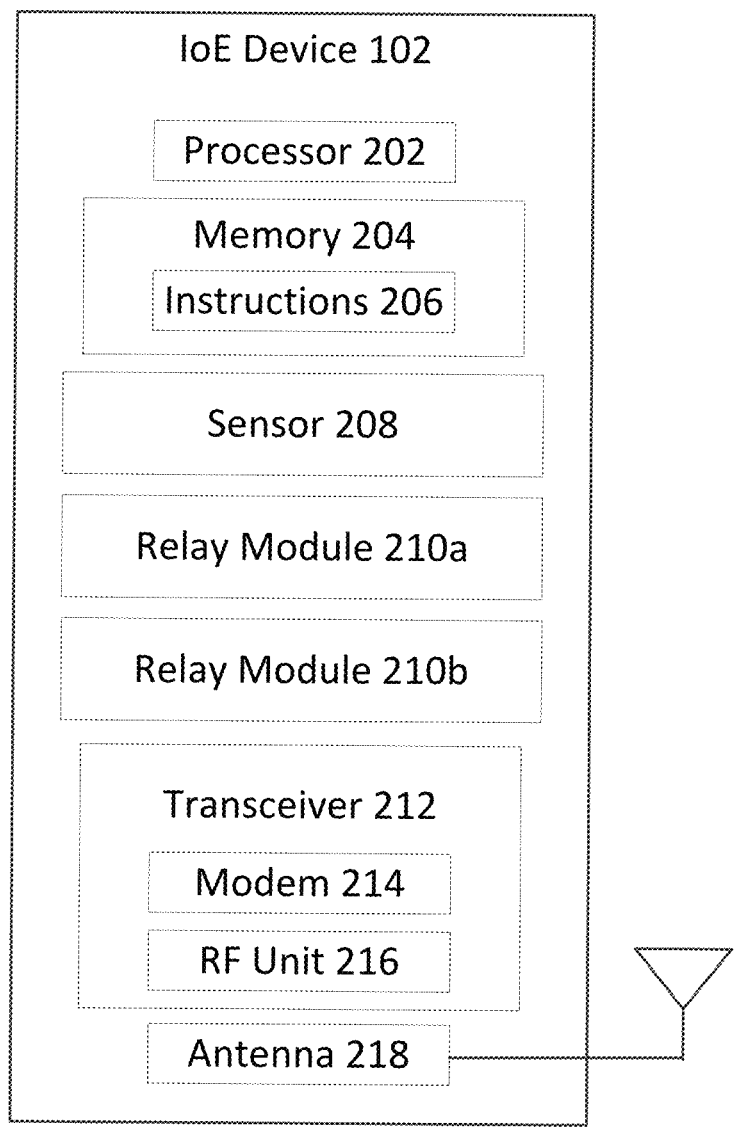
FIG. 2 illustrates an exemplary wireless communication device according to embodiments of the present disclosure.

FIG. 2 is a block diagram of an exemplary wireless communication device 200 according to embodiments of the present disclosure. The wireless communication device 200 may be an IoE device 102 that may have any one of many configurations for various IoE applications as described above. The IoE device 102 may include a processor 202, a memory 204, a sensor 208, a relay module 210, a transceiver 212, and an antenna 218. These elements may be in direct or indirect communication with each other, for example via one or more buses.

The processor 202 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to IoE devices 102. In particular, the processor 202 may be utilized in combination with the other components of the IoE device 102, including sensor 208 and relay module 210, to perform the various functions associated with embodiments of the present disclosure. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the IoE devices 102 in connection with embodiments of the present disclosure. Instructions 206 may also be referred to as code. The terms "instructions" and "code" may include any type of computer-readable statement(s). For example, the terms "instructions" and "code" may refer to one or more programs, routines, sub-routines, functions, procedures, etc.

"Instructions" and "code" may include a single computer-readable statement or many computer-readable statements.

The sensor 208 may be any sensor or meter capable of perceiving and capturing information about some aspect of its environment. This could include service metering (e.g., for gas utilities), temperature monitoring, pressure monitoring, fluid flow monitoring, inventory level monitoring, water level monitoring, equipment status monitoring, wildlife tracking, weather event monitoring, geological event monitoring, environmental monitoring, fleet tracking, and transaction-based business charging, to name just a few examples. Sensor 208 may send any information it captures as data to the transceiver 212 for transmission to a remote site, such as application server 110. Sensor 208 may also send any information it captures as data to the memory 204 for temporary or permanent storage.

The relay module 210 may be used for various aspects of the present disclosure. For example, the relay module 210 may be used in IoE devices 102 differently based on whether the IoE device 102 is in a position to be a relay device to other devices or in a position to seek to associate with another device as a relay device. To this end, for ease of illustration, relay module 210 is illustrated as relay modules 210a and 210b. Although illustrated separate, this is for ease of description only; as will be recognized, relay modules 210a and 210b may be separate or integrated with each other in software and/or hardware. Further, the relay modules 210a/210b may be defined by a combination of some or all of the other components of the IoE device 102 instead of being separate components. The relay module 210a may be used for aspects of the present disclosure corresponding to IoE devices 102 that are candidate relay devices. The relay module 210b may be used for aspects of the present disclosure corresponding to IoE devices that are seeking relay devices.

Considering first IoE devices 102 that are in a position to be a relay device to other devices, the relay module 210a may determine what tone or tones may be identified in a discovery broadcast as available for use in association requests. The exemplary use of IoE devices 102a and 102b will continue for ease of reference herein. In embodiments where the IoE device 102b is already associated as a relay device to one or more other devices, the relay module 210a may identify those CIDs used by other devices to send traffic to the IoE device 102b (as a relay device) and include all or a subset of the CIDs already being used as tones to be identified in a discovery broadcast. For the reasons noted above with respect to FIG. 1, the relay module 210a may identify these already-in-use CIDs in a discovery broadcast as available for use in association requests because, according to a data frame structure such as disclosed in FIG. 3B, the identified CIDs will not be in use for data transmission during an association slot. Thus, there would be no conflict on those specific tones when used during the association slot specifically.

Where the IoE device 102b is available as a relay device but has not associated with any other devices to relay their data yet, the relay module 210a may instead observe (monitor) the discovery frame generally (e.g., the discovery frames identified in FIG. 3A above) to determine what tones are being utilized in a neighborhood of the IoE device 102b at the time around which the IoE device 102b is going to be awake for relaying/receiving/transmitting data (since awake times are included in discovery broadcasts of potential relay devices). After monitoring some or all of the other discovery broadcasts during the discovery frame, the relay module 210a may select one or more (such as a small set) of tones that were not observed as being utilized during the discovery frame for inclusion in the IoE device 102b's own discovery broadcast. In such an embodiment, the relay module 210a may delay the IoE device 102b from sending its own discovery broadcast to a subsequent discovery frame after finishing monitoring the current discovery frame.

Either way, the relay module 210a may then insert the identified tones (either from already-in use CIDs with the IoE device 102b or monitored within the neighborhood of the IoE device 102b) into a discovery broadcast for transmission to listening devices that may need to establish a D2D connection for relay or other purposes. The relay module 210a may cause the IoE device 102b to update the list of tones periodically, upon demand, or upon some change to the IoE device 102b (e.g., addition or loss of devices using the IoE device 102b as a relay) or its environment (e.g., a change in signal, power, or other characteristics).

During a subsequent data frame, the relay module 210a may assist the IoE device 102b in processing one or more association requests received from corresponding one or more IoE devices 102 (e.g., 102a and 102d as some examples). These association requests (RTS1) may be received on one or more of the tones identified in the discovery broadcast. The IoE device 102b receiving this RTS1 may win this initial round of contention among potential relay devices where the CIDs used have the highest priority among others used for other candidate relay devices. In response, the relay module 210a may prepare a CTS1 message for transmission to the one or more other IoE devices 102 (such as 102a) seeking to associate with the IoE device 102b. The relay module 210a may include, as part of CTS1, information indicating an amount of time needed to complete reception of a subsequent RTS2 and/or general data packet. The relay module 210a then causes the IoE device 102b to transmit the CTS1 to the one or more other IoE devices 102. Another round of signaling may be introduced in order to resolve contention among the other IoE devices 102 so that the candidate IoE device 102b may establish an association with one of the other IoE devices 102 to serve as a relay device.

To that end, the candidate IoE device 102b may then receive an RTS2 from the other IoE devices 102 seeking a relay device. The RTS2 from each of the other IoE devices 102 may be on randomly selected CIDs. In contrast to the limited number of CIDs from which the IoE devices 102 choose for carrying RTS1, the IoE devices 102 may randomly select a tone from among a full bandwidth of available tones (the full CID block) for the candidate IoE device 102b. The relay module 210a takes these different RTS2 messages and may compare among them to select one, thereby selecting one of the IoE devices 102 (such as 102a) for association. This resolves contention from among potentially multiple IoE devices 102 seeking to associate with the candidate IoE device 102b as a relay. The relay module 210a may, for example, use lexicographical ordering (order of the symbol may have higher priority than the order of the tone) in order to select a highest priority tone for association. Other procedures may also be used for selection without departing from the scope of the present disclosure, as will be recognized, for example a random selection, selection according to a pre-programmed preference, according to some other metric such as signal strength, need rating (as provided by the IoE devices 102, such as in the RTS2), etc.

Once the relay module 210a has selected a specific CID, and therefore a specific IoE device 102 (for example, 102a) that randomly selected that tone, the relay module 210a prepares the CTS2 message. The CTS2 may similarly identify information such as an amount of time needed to complete reception of a data packet during a relevant portion of a subsequent data frame. The relay module 210a then instructs the IoE device 102b to send the CTS2 to the selected IoE device 102a. This indicates that the candidate IoE device 102b has accepted to associate with the IoE device 102a that used the selected tone as a relay, pending agreement on a specific CID for data traffic.

If multiple IoE devices 102 by chance randomly select the same tone, though unlikely due to the potentially small number of IoE devices 102 seeking a specific relay device, the relay module 210a may cause a failure message to be returned, which triggers the IoE devices 102 to seek association again in a subsequent association slot with the same or a different candidate IoE device 102.

After sending the CTS2, the candidate IoE device 102b may receive a subsequent message from the IoE device 102a that includes association data. The association data may include, for example, a complete address of the candidate IoE device 102b, a complete address of the selected IoE device 102a, a transmission periodicity of the IoE device 102a, an expected payload size, and a set of open tones in a neighborhood of the IoE device 102a. The relay module 210a accesses this set of open tones and compares the set against the known tone utilization within a neighborhood of the IoE device 102b. As mentioned above, the IoE device 102b may establish the known tone utilization based on the relay module 210a's observation of tone usage in signaling blocks and/or discovery broadcasts' tone usage during some previous time slot. If the relay module 210a identifies multiple matches (tones identified as open in both neighborhoods), the relay module 210a may randomly select one tone to serve as a CID between the candidate IoE device 102b and the selected IoE device 102a. Alternatively, the relay module 210a may be instructed to select the highest priority tone available among the overlapping (available) tones between the two neighborhoods. The relay module 210a inserts the selected tone into an ACK message, which the IoE device 102b then sends back to the IoE device 102a. The IoE device 102a is then ready to send uplink data to the IoE device 102b, via the selected CID, during a subsequent data frame.

If, however, there is no overlap between the tones identified in the association data message and those the relay module 210a has listed as available in the neighborhood of the IoE device 102b (as a result of the comparison against the two lists), the relay module 210a may instead create a new list of tones available within the neighborhood of the IoE device 102b. Instead of sending an ACK, since no tone could be agreed upon, the relay module 210a causes the IoE device 102b to send a message to the IoE device 102a that includes the new list of tones available to the IoE device 102b. In response, the IoE device 102a can initiate a new association request in a later time slot and, if possible, include one or more tones from the new list in a new association data message at that time.

Turning now to consider IoE devices 102 that are not in a position to be a relay device to other devices, the relay module 210b may initiate association requests and complete association with a candidate relay device, e.g. based on information identified in a discovery broadcast as available for use in association requests. IoE device 102a will be used as an example of a device seeking a candidate relay device, and IoE device 102b will again be used as an example of a candidate relay device.

The IoE device 102a may receive one or more discovery broadcasts during a given discovery frame, including for example from the IoE device 102b. Each discovery broadcast may include, for example, one or more tones that the IoE device 102a may use for sending an association request during an association slot in a data frame. The relay module 210b may determine, or receive instruction of such, that a relay device is desirable (e.g., based on the results of power consumption, path loss, etc. as mentioned above). As a result, the relay module 210b may select a discovery broadcast from a specific IoE device 102, e.g. IoE device 102b, to initiate association. In an embodiment, the selection may be based on a distance between IoE devices (e.g., a measured round trip time), a received signal strength of the different discovery broadcasts (e.g., selecting the broadcasting device whose discovery broadcast had the best RSS), identified awake times of the broadcasting devices, energy parameters of the broadcasting devices, or some other metric including random selection.

In this example, the relay module 210b may select the IoE device 102b. The relay module 210b then selects a tone (CID) from among those identified in the IoE device 102b's discovery broadcast. This selection may be based on a priority of the tones or a random selection. The selection may be small, for example just a small subset of tones corresponding to either those available within the neighborhood of the IoE device 102b or those already being used as CIDs during data frames for data packets with other IoE devices that have already associated with the IoE device 102b. After selecting a tone, the relay module 210b prepares a first association request message, RTS1. This may include, for example, an indication of the IoE device 102a's desire to associate with a relay device, as well as information about a time of channel use, data size, etc.

The IoE device 102a subsequently receives a CTS1 from the IoE device 102b, for example as described above. The relay module 210b, in response to receiving CTS1, proceeds with the second round of RTS/CTS in order to get through contention with potentially other IoE devices 102 seeking to associate with the IoE device 102b at that given time. The relay module 210b selects another tone on which to send another association request message (RTS2). This may be a random selection of a tone from among a full (or partial) bandwidth of tones, whether available or not (because none of the tones are used for regular data transmission during the association slot), from the full (or partial) CID block.

The IoE device 102a sends the RTS2 using the randomly selected tone by the relay module 210b. Upon receipt of CTS2 at the IoE device 102a, the relay module 210b prepares an association data message for transmission to the IoE device 102b. To this end, the relay module 210b may cause the IoE device 102a to observe signaling blocks' and/or discovery broadcasts' tone usage within a neighborhood of the IoE device 102a, such as during a previous time slot (a prior data frame and/or discovery frame, for example). Those tones that the relay module 210b observes as in use already may be excluded from a list of possible CIDs included in the association data. The relay module 210b may include all of the tones identified as available within the neighborhood of the IoE device 102a, or alternatively some subset thereof. This list is included in the association data message, which may also include one or more of a complete address of the candidate IoE device 102b, a complete address of the selected IoE device 102a, a transmission periodicity of the IoE device 102a, and an expected payload size.

As discussed above with respect to the relay module 210a, a determination is made whether any of the tones listed by the relay module 210b overlap with any tones available within a neighborhood of the IoE device 102a (the candidate relay device). Where there is overlap, the IoE device 102a receives an ACK message that includes a selected CID from among the list of available tones (corresponding to a tone that overlaps in availability between the two devices). Where there is not overlap, the IoE device 102a receives a message that includes a new list of tones available within a neighborhood of the IoE device 102b.

In such situations, the relay module 210b causes the current association attempt to end, and causes the IoE device 102a to initiate another association attempt in a subsequent slot (e.g., either a subsequent slot in the current data frame where there are multiple association slots or in a new data frame). In the new association request, after clearing RTS1/CTS1 and RTS2/CTS2, the relay module 210b compares the available tones from the new list against those available within the neighborhood of the IoE device 102a. From this comparison, where there is some overlap, the relay module 210b may include one or more from the overlapping tones into a new association data message to the IoE device 102b. In that situation, an ACK should then be received with a selected CID from the overlapping tones. If an ACK is still not received, or the relay module 210b determines that there is no overlap, the relay module 210b may turn to attempting to identify and associate with another candidate relay device.

Although the above embodiments with respect to relay modules 210a and 210b have been described with respect to using specific tones (e.g., detecting energy on selected tones during RTS1/CTS1 and RTS2/CTS2), other embodiments are also possible. For example, carrier sense multiple access with collision avoidance (CSMA/CA) with random backoff may alternatively be used, but with the additional contention resolution round of RTS2/CTS2.

As shown, the transceiver 212 may include the modem subsystem 214 and the radio frequency (RF) unit 216. The transceiver 212 can be configured to communicate bi-directionally with other devices, such as other IoE devices 102 and UEs 106 (e.g., D2D), and base stations 104. The modem subsystem 214 may be configured to modulate and/or encode the data from the relay module 210 and other aspects of the IoE device 102, such as processor 202 and/or memory 204, according to a modulation and coding scheme (MCS), e.g., a low-density parity check (LDPC) coding scheme, a turbo coding scheme, a convolutional coding scheme, etc. The RF unit 216 may be configured to process (e.g., perform analog to digital conversion or digital to analog conversion, etc.) modulated/encoded data from the modem subsystem 214 (on outbound transmissions) or of transmissions originating from another source such as a base station 104. Although shown as integrated together in transceiver 212, the modem subsystem 214 and the RF unit 216 may be separate devices that are coupled together at the IoE device 102 to enable the IoE device 102 to communicate with other devices.

The RF unit 216 may provide the modulated and/or processed data, e.g. data packets (or, more generally, data messages that may contain one or more data packets and other information), to the antenna 218 for transmission to one or more other devices. This may include, for example, transmission of RTS1, RTS2, and association data according to embodiments of the present disclosure. The antenna 218 may further receive data messages transmitted from other devices, such as discovery broadcasts and CTS1, CTS2 according to embodiments of the present disclosure, and provide the received data messages for processing and/or demodulation at the transceiver 212. Although FIG. 2 illustrates antenna 218 as a single antenna, antenna 218 may include multiple antennas of similar or different designs in order to sustain multiple transmission links.

Turning now to FIG. 3B, a diagram of a frame structure of a data frame 350 is illustrated according to embodiments of the present disclosure. As shown in FIG. 3B, a data frame may include a variety of different blocks between frame beginning markers (FB). The period between two frame beginning markers (FB) is a frame period (FP). Within a frame period (FP), there may be a signaling block (SB), a prioritized slot (PS), a contention slot (CS), an association slot (AS), and an inactive period (IP). An example of such a data frame is described in U.S. patent application Ser. No. 14/684,191, filed Apr. 10, 2015 and titled "IOE DEVICE TRANSMISSION SIGNALING AND SCHEDULING," which is incorporated by reference herein in its entirety. The signaling block (SB) may include a signaling element for each of the prioritized slot (PS), contention slot (CS), and the association slot (AS). For each slot illustrated, any number of slots may be contemplated and included, subject to any restraints of a given application.

Figure 4A:
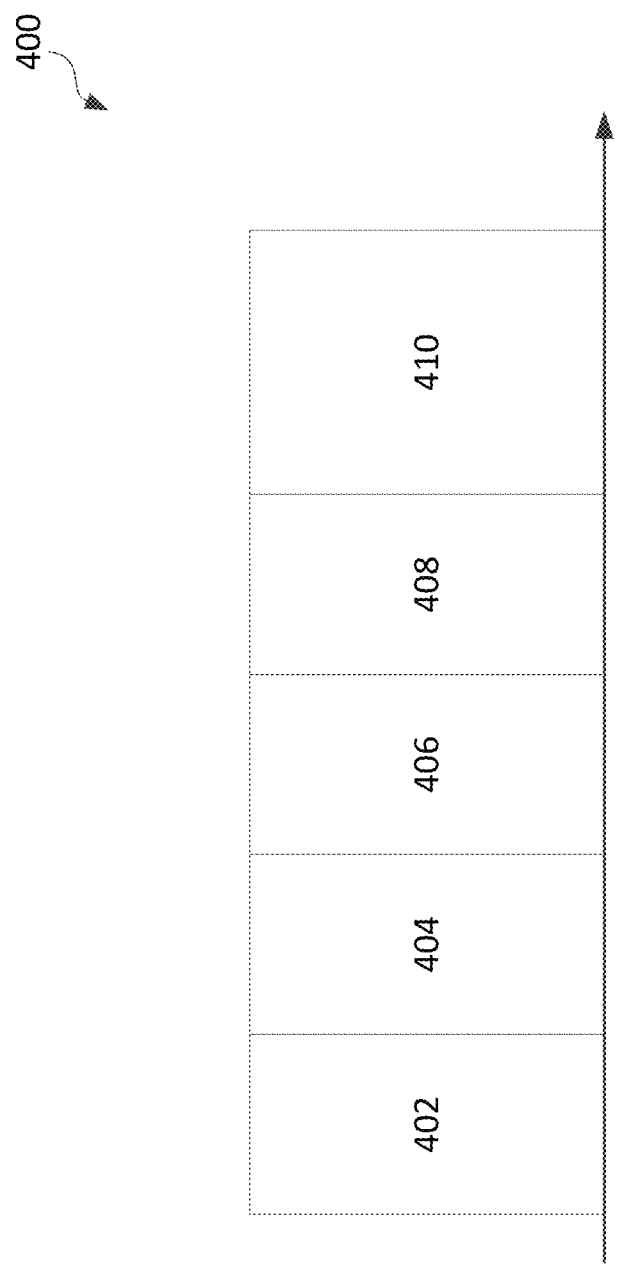
FIG. 4A is a diagram of a slot structure of an association slot of a data frame according to embodiments of the present disclosure.

Within a given association slot (AS) as illustrated in FIG. 3B, an exemplary structure is illustrated in FIG. 4A, which provides a diagram of a slot structure 400 of an association slot (AS) of a data frame according to embodiments of the present disclosure. This structure is used to resolve contention among multiple candidate relay devices as well as multiple IoE devices seeking a relay device, as discussed above.

The slot structure 400 may include a first association request 402, for example RTS1 as described with respect to FIGS. 1 and 2. The slot structure 400 may also include a first association response 404, for example CTS1 as described above. The slot structure may also include second association request 406, for example RTS2 as described above. The slot structure may also include second association response 408, for example CTS2 as described above. Association request/response 402/404 may be used to help resolve contention among multiple association request-receiving devices (candidate relay devices). Once a candidate relay device is selected, association request/response 406/408 may be used to resolve contention among potentially multiple IoE devices requesting association to the candidate relay device. Slot 410 may be a contention resolution slot, for example in an embodiment including the association data and ACK message/denial message as described above with respect to FIGS. 1 and 2, and in another embodiment including regular data, or some combination of the above. In situations where a candidate relay device (e.g., IoE device 102b of FIG. 1) does not receive an association request 402 (RTS1), the candidate relay device's use of the given association slot may fall back to use as a contention slot with its own contention resolution as slot 410.

Figure 4B:
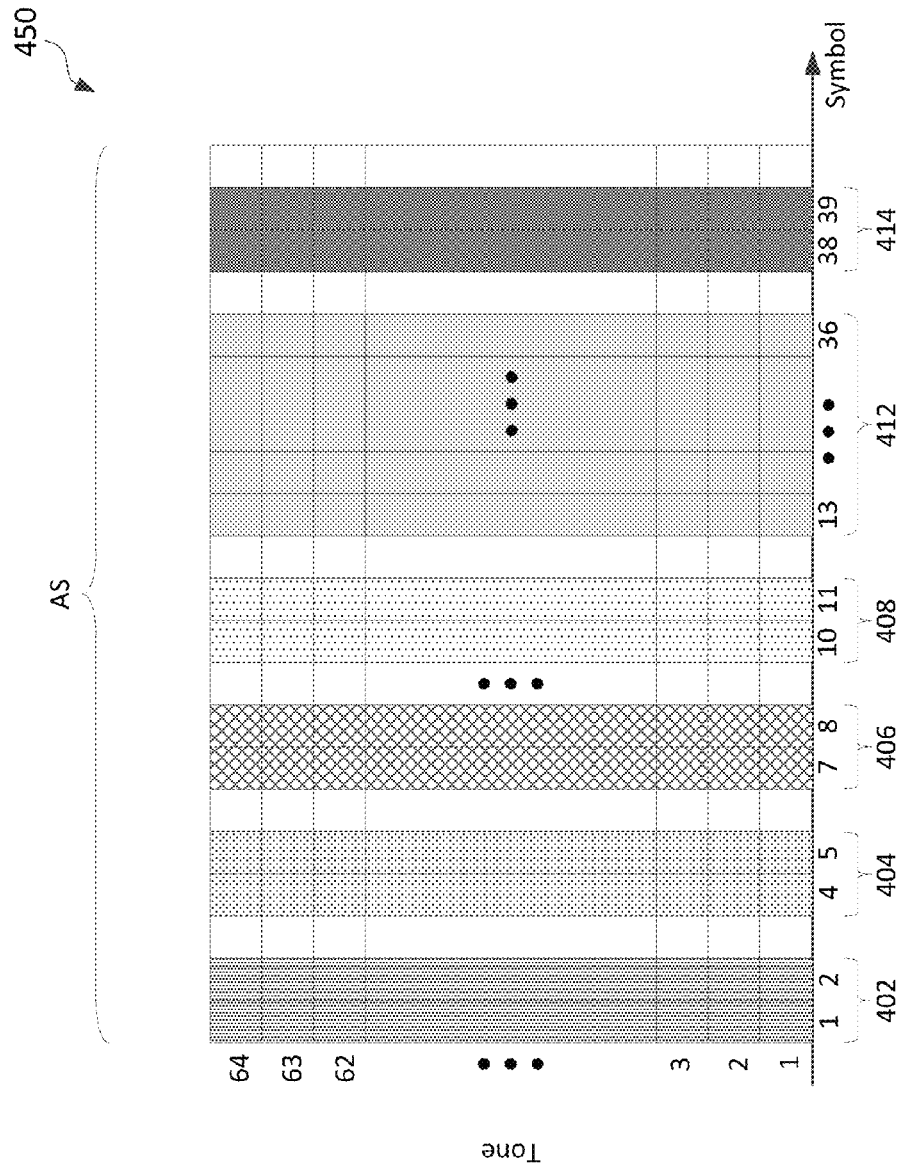
FIG. 4B is a diagram of a slot structure of an association slot of a data frame according to embodiments of the present disclosure.

FIG. 4B is a diagram of a slot structure 450 of an association slot (AS) of a data frame according to embodiments of the present disclosure. For example, the slot structure 450 may be a specific example of the slot structure 400 of FIG. 4A, using tone signaling with respect to RTS1/CTS1 and RTS2/CTS2. The illustrated communications may occur between a requesting IoE device 102, such as the exemplary IoE device 102a of FIG. 1, and a candidate relay device, such as exemplary IoE device 102b of FIG. 1.

In an exemplary association slot (AS), the first association request 402 (RTS1) may occupy one or more symbols on one or more tones. For example, a first two symbols may be used for the first association request 402, which may include less than a full identifier and/or address of the transmitting IoE device 102. The discovery broadcast may have identified one or more tones from among the channel of tones available. The number of available tones may be limited from the total number of tones in the channel. For example, FIG. 4B illustrates an exemplary number of tones, 64, as being available in a given channel. The channel itself may have a bandwidth of 1 MHz, for example. This is exemplary only; as will be recognized, a given channel may have a different bandwidth size and fewer or more tones may be selected for inclusion in a discovery broadcast without departing from the scope of the present disclosure. The number of tones selected for inclusion in the discovery broadcast may be influenced, for example, by the amount of data available in the payload of the discovery broadcast for tone data. The first association request 402 may occupy a selected tone from among the subset of tones available.

A first association response 404 (CTS1) may follow the first association request 402 and may occupy one or more symbols. As illustrated, a symbol is left unoccupied between the first association request 402 and the first association response 404; fewer or more may be left unoccupied as will be recognized. The first association response 404 may occupy the same tone(s) selected and used for the first association request 402.

A second association request 406 (RTS2) may occupy one or more symbols after the first association response 404. As illustrated, a symbol is left unoccupied between the first association response 404 and the second association request 406; fewer or more may be left unoccupied as will be recognized within the association slot (AS). The second association request 406 may occupy a tone selected from the full bandwidth of the channel, instead of just those tones identified in a prior discovery broadcast.

A second association response 408 (CTS2) may follow the second association request 406 and occupy one or more symbols. As illustrated, a symbol is left unoccupied between the second association request 406 and the second association response 408; fewer or more may be left unoccupied as will be recognized within the association slot (AS). The second association response 408 may occupy the same tone(s) selected and used for the second association request 406.

In response to the second association response 408, an association data message 412 is transmitted from the requesting IoE device 102a to the candidate IoE device 102b. The association data may include, for example, a complete address of the candidate IoE device 102b, a complete address of the selected IoE device 102a, a transmission periodicity of the IoE device 102a, an expected payload size, and a set of open tones in a neighborhood of the IoE device 102a. As such, the association data message 412 may occupy more symbols over time than the prior requests/responses. 24 symbols is an exemplary embodiment only; more or fewer may be used depending upon the amount of data included and/or the constraints of the association slot. In an embodiment, the association data message 412 may occupy the same randomly selected tone(s) as used for the second association request/response 406/408.

In response to the association data message 412, the candidate IoE device 102b sends an acknowledge message 414 (ACK) back to the requesting IoE device 102a. The acknowledge message 414 is generated and sent when the candidate IoE device 102b identifies overlap between one of the tones identified in the set of open tones in the association data message 412 and available tones within a neighborhood of the candidate IoE device 102b. As the ACK may include the selected tone, instead of a list of tones, the acknowledge message 414 may be shorter and hence occupy fewer symbols than the association data message 412, e.g. a same number of symbols as the request/response messages.

If, however, there is no overlap between the tones identified in the association data message 412 and those identified as available in the neighborhood of the candidate IoE device 102b, the acknowledge message 414 may not be an ACK but instead be a message that includes a new list of tones available to the candidate IoE device 102b. This may occupy the number of symbols illustrated or alternatively more symbols (or fewer) as will be recognized.

Figure 5:
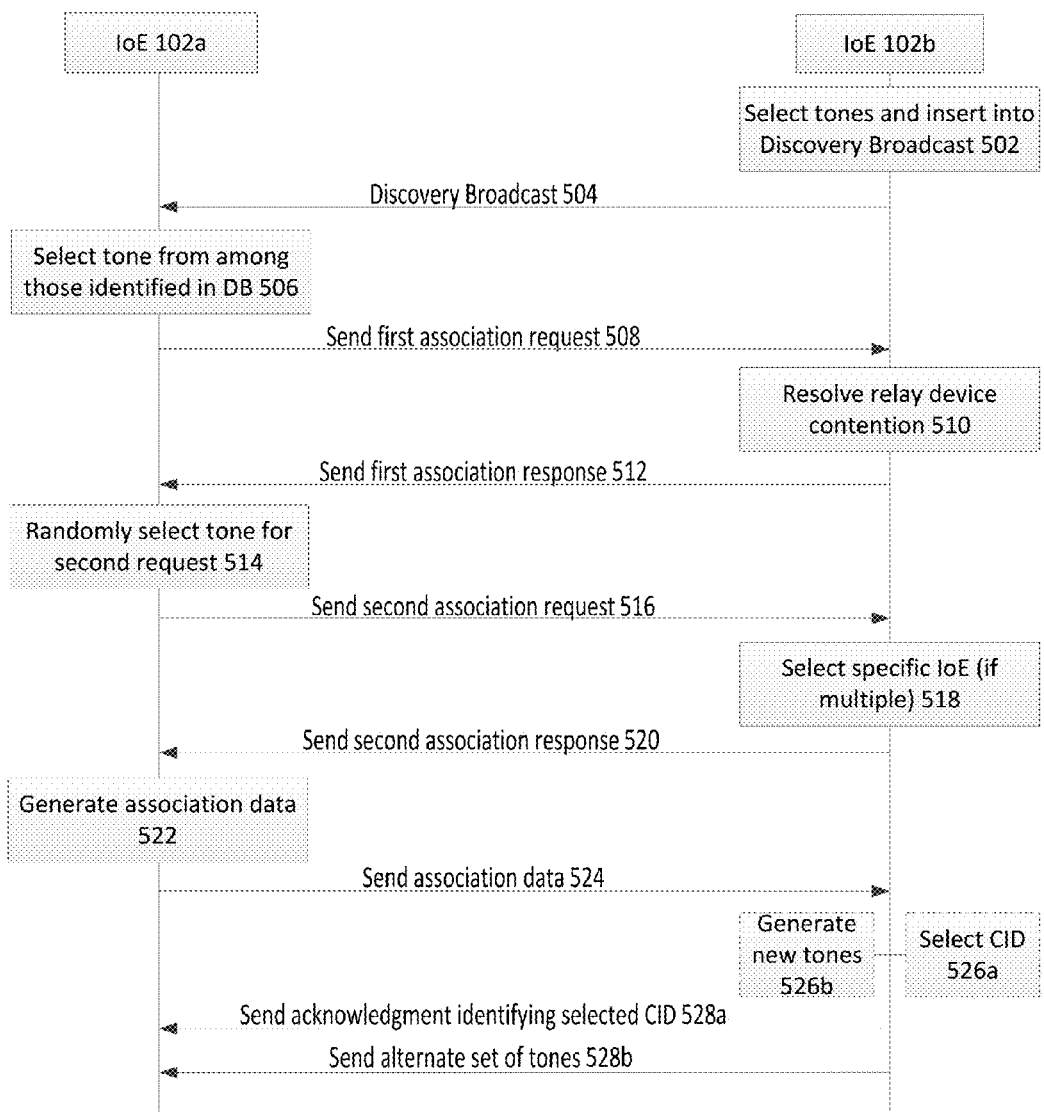
FIG. 5 is a protocol diagram illustrating exemplary signaling aspects between a wireless communication device and a candidate relay device in accordance with various aspects of the present disclosure.

Referring now to FIG. 5, shown is a protocol diagram 500 illustrating exemplary signaling aspects between an IoE device 102 in need of relay service and an IoE device 102 identified as available for relay service in accordance with various aspects of the present disclosure. The IoE device 102 in need of service will be described according to the example above as IoE device 102a. The IoE device 102 available for providing relay service will be described according to the example above as IoE device 102b.

At action 502, IoE device 102b selects one or more tones for inclusion into a discovery broadcast. Where the IoE device 102b already has one or more CIDs associated with one or more other devices, the IoE device 102b's selection may include selecting one or more of these CIDs for inclusion. In addition or alternatively, the IoE device 102b may monitor the discovery frame generally to determine what tones are being utilized in a neighborhood of the IoE device 102b at the time around which the IoE device 102b is going to be awake. The IoE device 102b may select one or more (such as a small set) of tones that were not observed as being utilized during the discovery frame for inclusion in the IoE device 102b's own discovery broadcast. For example, this may occur where the IoE device 102b does not already operate as a relay to one or more other devices.

After including the selected tone in the discovery broadcast, at action 504 the IoE device 102b broadcasts the discovery broadcast with the information to any listening devices.

The IoE device 102a receives the discovery broadcast. This occurs, for example, during a discovery frame such as illustrated above with respect to FIG. 3A. At action 506, the IoE device 102a parses out the discovery broadcast to obtain a list of the tones included by the IoE device 102b. The IoE device 102a selects a tone from among the list for use in transmitting a first association request to the IoE device 102b.

During a subsequent data frame, such as illustrated in FIG. 3A, and specifically during an association slot such as illustrated in FIG. 3B, at action 508 the IoE device 102a sends a first association request to the IoE device 102b. This may be, for example, as described above with respect to association request 402 of FIGS. 4A/4B.

At action 510, the IoE device 102b upon receipt of the first association request may resolve any contention among other potential relay devices. For example, in an embodiment contention resolution among different potential relay devices may be resolved by the potential relay device having the highest priority CID winning (e.g., with an example of priority as described above with respect to FIG. 4B). Here, in an example embodiment the IoE device 102b wins contention among any potential relay devices.

At action 512, the IoE device 102b sends a first association response to the IoE device 102a in response to winning the contention. The first association response may be as described above with respect to association response 404 of FIGS. 4A/4B.

At action 514, the IoE device 102a randomly selects a tone, such as from among a full channel, for sending a second association request. This is done in response to receiving the first association response from the IoE device 102b.

At action 516, the IoE device 102a sends the second association request to the IoE device 102b, using the randomly selected tone for transmission of the one or more symbols. The random selection of a CID for the second association request may enable the chance of conflict between requesting IoE devices to be reduced, as the number of devices attempting to associate with the same IoE device 102b for relay in a given data frame may be small. The second association request may be as described above with respect to association request 406 of FIGS. 4A/4B.

At action 518, the IoE device 102b selects a specific IoE device for which to function as a relay device. For example, the IoE device 102 may select the IoE device 102a. Selection may be made, for example, using lexicographical ordering (order of the symbol may have higher priority than the order of the tone) in order to select a highest priority tone, corresponding to an IoE device that selected and used that tone, for association. Other procedures may also be used for selection without departing from the scope of the present disclosure, as will be recognized, for example a random selection, selection according to a pre-programmed preference, according to some other metric such as signal strength, need rating, etc.

At action 520, the IoE device 102b sends the second association response to the selected IoE device 102a. The second association response may be as described above with respect to second association response 408 of FIGS. 4A/4B.

At action 522, the IoE device 102a generates association data in response to receipt of the second association response. The association data may include, for example, a complete address of the candidate IoE device 102b, a complete address of the selected IoE device 102a, a transmission periodicity of the IoE device 102a, an expected payload size, and a set of open tones in a neighborhood of the IoE device 102a. The association data may be as described above with respect to association data message 412 of FIG. 4B.

At action 524, the IoE device 102a sends the generated association data to the IoE device 102b.

Upon receipt of the association data, the IoE device 102b may either select one of the tones identified in the association data message or generate a new list of available tones, depending on whether there is any overlap between the tones identified in the association data and the tones available in the neighborhood of the IoE device 102b. This is illustrated in FIG. 5 with the alternatives 526a and 526b. Under either alternative, the IoE device 102b compares the identified tones in the association data against those tones available within the neighborhood of the IoE device 102b.

Action 526a occurs where the comparison results in one or more overlapping tones. As a result, the IoE device 102b selects a tone as a CID for a link between the IoE device 102a and the IoE device 102b during subsequent data frames.

Action 526b occurs where the comparison results in failing to identify any overlapping tones by the IoE device 102b. In this situation, the IoE device 102b instead generates a new list of possible tones to select as CID. This new list may include, for example, tones available within the neighborhood of the IoE device 102b (which the IoE device 102b may obtain by monitoring discovery broadcasts/signaling blocks within the neighborhood at the relevant times).

If action 526a occurred, then at action 528a the IoE device 102b sends an acknowledgement (e.g., ACK) to the IoE device 102a. As part of the ACK, the IoE device 102b includes information identifying the selected CID for the IoE device 102a to use in subsequent data communication.

If instead action 526b occurred, then at action 528b the IoE device 102 sends a message to the IoE device 102a that includes the new list of tones available to the IoE device 102b generated at action 526b. In response, the IoE device 102a can initiate a new association request in a later time slot and, if possible, include one or more tones from the new list in a new association data message at that time.

Figure 6:
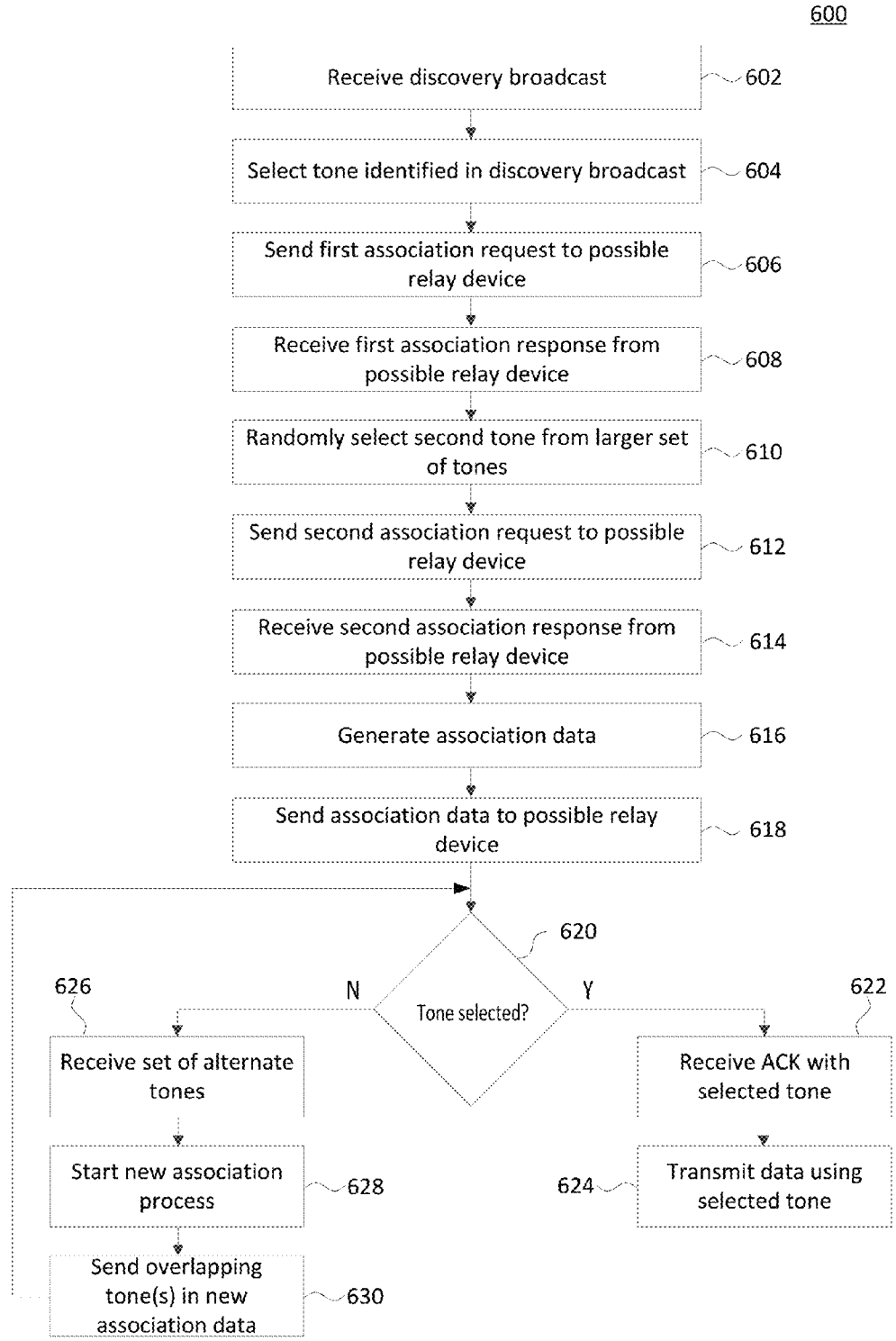
FIG. 6 is a flowchart illustrating an exemplary method for wireless communication in accordance with various aspects of the present disclosure.

Turning now to FIG. 6, shown therein is a flowchart illustrating a method 600 for wireless communication according to aspects of the present disclosure. In particular, the method 600 illustrates association of a device desiring relay service according to embodiments of the present disclosure. Method 600 may be implemented by an IoE device 102 in need of relay service. For ease of illustration, reference will be made to the example using IoE device 102a, with IoE device 102b being available to provide relay service. It is understood that additional steps can be provided before, during, and after the steps of method 600, and that some of the steps described can be replaced or eliminated from the method 600.

At block 602, the IoE device 102a receives a discovery broadcast from one or more other devices that are available for relay service. In this example, the IoE device 102a receives the discovery broadcast from IoE device 102b. This occurs during an exemplary discovery frame as illustrated in FIG. 3A above. The discovery broadcast includes one or more tones identified as available for use in association requests in an association slot of a data frame. The tones may be identified for example as described with respect to action 502 of FIG. 5.

At block 604, the IoE device 102a selects a tone from among those identified as available in the discovery broadcast received at block 602 for use in transmitting a first association request to the IoE device 102b. This may occur during the discovery frame or during a subsequent data frame.

At block 606, the IoE device 102a sends a first association request to the IoE device 102b using the tone selected at block 604. This may occur, for example, during an association slot (AS) of a data frame as described above with respect to FIG. 3B, for example as described above with action 508 of FIG. 5 and with respect to the association request 402 of FIGS. 4A/4B.

At block 608, the IoE device 102a receives a first association response from the IoE device 102b, for example after the IoE device 102b resolves any potential contention among multiple candidate relay devices (including the IoE device 102b according to this example). The first association response may be as described above with respect to association response 404 of FIGS. 4A/4B.

At block 610, the IoE device 102a proceeds with another round of contention resolution (e.g., another RTS/CTS round) in response to receiving the first association response at block 608. To this end, the IoE device 102a randomly selects a tone, such as from among a full channel available instead of the subset identified in the discovery broadcast.

At block 612, the IoE device 102a sends a second association request to the IoE device 102b using the randomly selected tone from block 610. The second association request may be as described above with respect to association request 406 of FIGS. 4A/4B.

At block 614, the IoE device 102a receives a second association response from the IoE device 102b, for example as a result of the IoE device 102b resolving contention from among potentially multiple requesting IoE devices (including the IoE device 102a according to this example). The second association response may be as described above with respect to second association response 408 of FIGS. 4A/4B.

At block 616, the IoE device 102a generates association data in response to receiving the second association response from the IoE device 102b, which indicated that the IoE device 102a had won contention for the IoE device 102b as a relay. As part of this, the IoE device 102a may observe signaling blocks' and/or discovery broadcasts' tone usage within a neighborhood of the IoE device 102a, such as during a previous time slot (a prior data frame and/or discovery frame, for example). Those observed as already in use within a neighborhood of the IoE device 102a may be excluded from the list. All of the tones identified as available within the neighborhood of the IoE device 102a may be included, or alternatively some subset thereof. The association data may include, for example, a complete address of the IoE device 102b, a complete address of the IoE device 102a, a transmission periodicity of the IoE device 102a, an expected payload size, and a set of open tones in a neighborhood of the IoE device 102a, to name a few examples. The association data may include other information as well. The association data may be as described above with respect to association data message 412 of FIG. 4B.

At block 618, the IoE device 102a sends the generated association data from block 616 to the IoE device 102b, so that the IoE device 102b may select a specific tone from among those identified in the association data.

At decision block 620, if the IoE device 102b is able to select a specific tone from among those identified in the association data (e.g., because there is overlap between the tones included and those available within the neighborhood of the IoE device 102b), the method 600 proceeds to block 622.

At block 622, the IoE device 102a receives an acknowledgement message from the IoE device 102b. The acknowledgement message includes a selected CID from among the list of available tones (corresponding to a tone that overlaps in availability between the two devices).

At block 624, the IoE device 102a transmits data to the IoE device 102b (for the IoE device 102b to relay further) using the selected CID. This may occur at a subsequent data frame.

Returning to decision block 620, if the IoE device 102b was not able to select a specific tone, e.g. out of failure of any listed tones to overlap with available tones in the neighborhood of the IoE device 102b, the method 600 instead proceeds to block 626.

At block 626, instead of an ACK, the IoE device 102a receives a message from the IoE device 102b that includes a new list of tones available within a neighborhood of the IoE device 102b.

At block 628, the IoE device 102a initiates a new association process with the IoE device 102b in response to the message received at block 626. This may occur in the current association slot, if there is sufficient time available still, or alternatively in a subsequent data frame. The new association process may occur as described above with respect to blocks 602 through 616. As part of this new process, when generating a new list of available tones for inclusion in association data, the IoE device 102a may confirm that one or more of the tones received at block 626 overlap with tones available within a neighborhood of the IoE device 102a. If there is no overlap, the IoE device 102a may seek to associate with a different candidate relay device (where available). If there is overlap, the IoE device 102a includes the overlapping tone(s) in the association data.

At block 630, the IoE device 102a sends the association data in the new association process, where the association data includes the overlapping tone(s) (as well as potentially other available tones), as generated from block 628. The method 600 may then return to decision block 620 and proceed as discussed above. In an embodiment, the IoE device 102a may keep track of how many times association with the IoE device 102b fails, and cease attempts after a threshold number of times in order to seek successful association with another candidate relay device.

Figure 7:
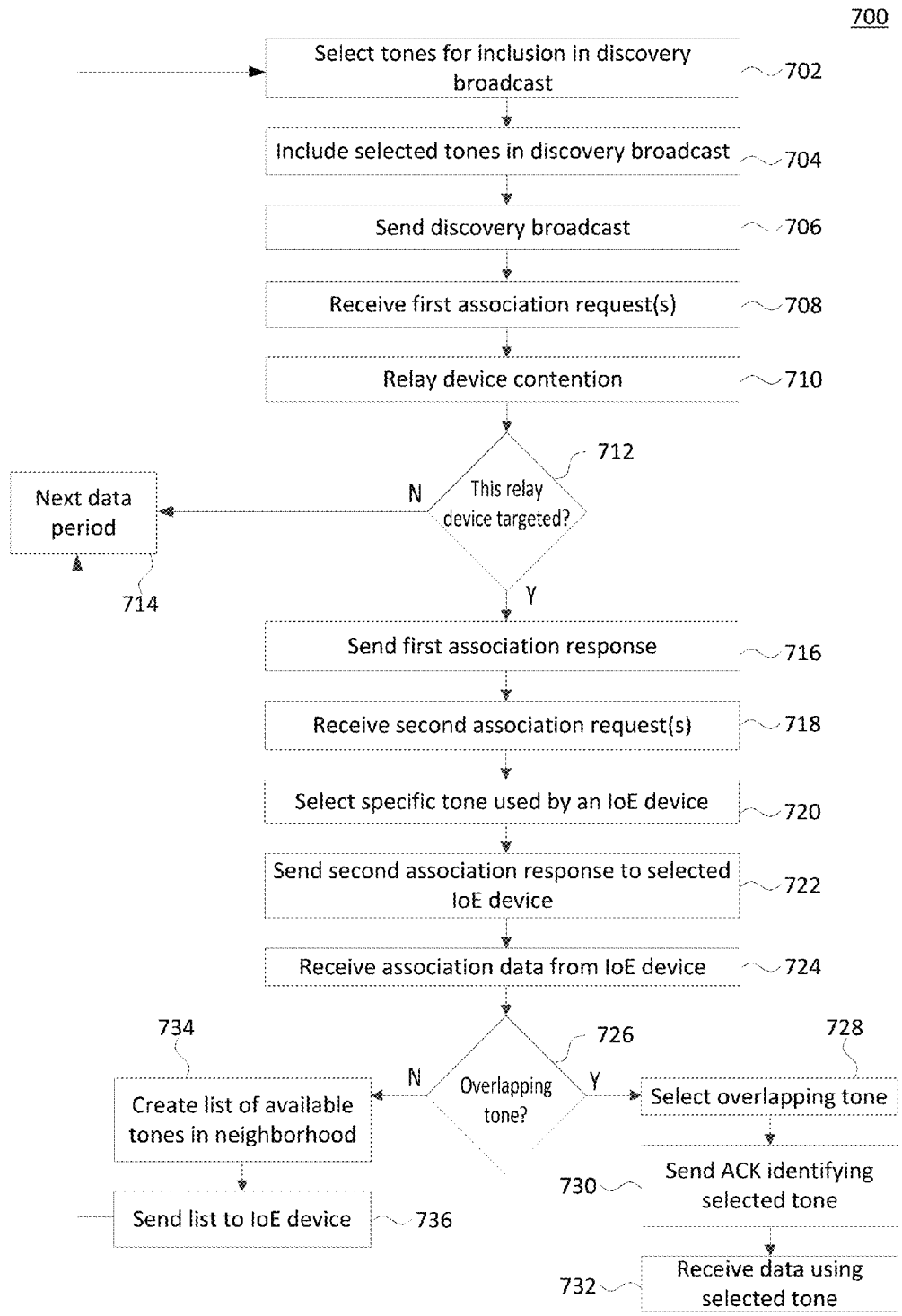
FIG. 7 is a flowchart illustrating an exemplary method for wireless communication in accordance with various aspects of the present disclosure.

Turning now to FIG. 7, shown therein is a flowchart illustrating a method 700 for wireless communication according to aspects of the present disclosure. In particular, the method 700 illustrates association of a device providing relay service according to embodiments of the present disclosure. Method 700 may be implemented by an IoE device 102 capable of providing relay service. For ease of illustration, reference will be made to the example using IoE device 102b. It is understood that additional steps can be provided before, during, and after the steps of method 700, and that some of the steps described can be replaced or eliminated from the method 700.

At block 702, the IoE device 102b selects one or more tones for inclusion in a discovery broadcast. These tones are selected in order to provide any devices desiring the receipt of relay service with available tones to use in the association procedures of the present disclosure. For example, this might include one or more CIDs for devices already associated with the IoE device 102b. In addition or alternatively, the IoE device 102b may monitor the discovery frame generally to determine what tones are being utilized in a neighborhood of the IoE device 102b at the time around which the IoE device 102b is going to be awake. The IoE device 102b may select one or more (such as a small set) of tones that were not observed as being utilized during the discovery frame for inclusion in the IoE device 102b's own discovery broadcast.

At block 704, the IoE device 102b includes the one or more tones selected at block 702 in a discovery broadcast. This may occur, for example, during a discovery frame as described above with respect to FIG. 3A.

At block 706, the IoE device 102b sends the discovery broadcast, for example as a broadcast during a discovery frame for any devices within range and/or within a predetermined number of hops of the IoE device 102b.

At block 708, the IoE device 102b receives association requests from devices seeking to obtain relay service. This may occur, for example, during an association slot (AS) of a data frame as described above with respect to FIG. 3B. The IoE device 102b may receive multiple association requests from multiple devices, including the IoE device 102a in this example.

At block 710, the IoE device 102b resolves contention among other candidate relay devices, for example within a 2-hop neighborhood. For example, where the IoE device 102b receives the highest priority CID (in this example) it may win contention during this first round.

At decision block 712, where the IoE device 102b does not win contention, or the IoE device 102b was not the target of any association requests, the method 700 may proceed to block 714.

At block 714, the IoE device 102b waits for a next time period. For example, the IoE device 102b may go back to sleep until the next wake-up period, which may be a discovery frame or a data frame to name some examples. As such, the method 700 may proceed back to block 702 as described above.

Returning to decision block 712, if the IoE device 102b was a target relay device and won contention, the method 700 proceeds to block 716.

At block 716, the IoE device 102b sends a first association response to the IoE device 102a (and any other devices that may be seeking association with the IoE device 102b during the association slot). The first association response may be as described above with respect to association response 404 of FIGS. 4A/4B.

At block 718, the IoE device 102b receives a second association request from the devices seeking to obtain relay service from the IoE device 102b specifically during the association slot. The second association request may be as described above with respect to association request 406 of FIGS. 4A/4B. For example, the second association request may be sent using a tone randomly selected by the one or more IoE devices seeking association.

At block 720, the IoE device 102b reviews all of the second association requests received (whether one or more), and selects one. For example, the IoE device 102b may analyze the randomly-selected tones as the basis to select. Selection may be made, for example, using lexicographical ordering (order of the symbol may have higher priority than the order of the tone) in order to select a highest priority tone, corresponding to an IoE device that selected and used that tone, for association. Other procedures may also be used for selection without departing from the scope of the present disclosure, as will be recognized, for example a random selection, selection according to a pre-programmed preference, according to some other metric such as signal strength, need rating, etc. The IoE devices that are not selected may attempt another association request with another relay device or with the IoE device 102b at a subsequent time. In the current example, the IoE device 102b selects the tone that the IoE device 102a randomly selected and used for the second association request. As a result, the IoE device 102b selects the IoE device 102a.

At block 722, the IoE device 102b sends a second association response to the selected at block 720, here IoE device 102a. The second association response may be sent using the same tone. The second association response may be as described above with respect to second association response 408 of FIGS. 4A/4B, for example identifying information such as an amount of time needed to complete reception of a data packet during a relevant portion of a subsequent data frame.

At block 724, the IoE device 102b receives an association data message from the IoE device 102a whose randomly-selected tone was selected at block 720. The association data may include, for example, a complete address of the IoE device 102b, a complete address of the IoE device 102a, a transmission periodicity of the IoE device 102a, an expected payload size, and a set of open tones in a neighborhood of the IoE device 102a, to name a few examples. The association data may include other information as well. The association data may be as described above with respect to association data message 412 of FIG. 4B.

At decision block 726, the IoE device 102b determines whether any one or more tones identified in the association data message overlaps with any of the available tones within a neighborhood of the IoE device 102b. For example, although the IoE device 102b identified CIDs in the discovery broadcast, those CIDs (already assigned to other devices for data periods) are not available for regular data transmission during data slots of a data frame. Thus, those would not be available as a CID for IoE device 102a. The IoE device 102b may compare the tones identified in the association data against the tones in use in the neighborhood of the IoE device 102b, and identify overlapping tones.

If there is an overlapping tone (or multiple), the method 700 proceeds to block 728. At block 728, the IoE device 102b selects an overlapping tone (e.g., based on priority if there are multiple available) as a CID that will be reserved for the IoE device 102a during subsequent data frames.

At block 730, the IoE device 102b includes the selected CID in an acknowledgement message (such as an ACK) that is sent to the IoE device 102a. The IoE device 102a will use this CID for future data transmission to the IoE device 102b as a relay device.

At block 732, the IoE device 102b receives one or more data packets from the IoE device 102a using the selected CID from block 728. The data packets may be received during a subsequent data frame during the appropriate data slot.

Returning to decision block 726, if there are no overlapping tones, the method 700 proceeds to block 734. No overlap refers to none of the tones identified in the association data message corresponds to any of those identified as available in the neighborhood of the IoE device 102b.

At block 734, the IoE device 102b creates a new list of tones available within the neighborhood of the IoE device 102b.

At block 736, Instead of sending an ACK, since no tone could be agreed upon, the IoE device 102b sends a message to the IoE device 102a that includes the new list of tones available to the IoE device 102b.

The method 700 proceeds back to block 714, where a wait occurs for a next data period (data frame), where the IoE device 102a can initiate a new association request in a later time slot and, if possible, include one or more tones from the new list in a new association data message at that time (based on the information the IoE device 102b sent at block 736).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). It is also contemplated that the features, components, actions, and/or steps described with respect to one embodiment may be structured in different order than as presented herein and/or combined with the features, components, actions, and/or steps described with respect to other embodiments of the present disclosure.

Embodiments of the present disclosure include a computer-readable medium having program code recorded thereon, the program code comprising code for causing a first wireless communication device to transmit, to a second wireless communication device, a first association request during a reserved time slot of a first data frame using a first tone available for an association request. The program code further comprises code for causing the first wireless communication device to randomly select a second tone from among a plurality of available tones based on a first response from the second wireless communication device to the first association request during the reserved time slot. The program code further comprises code for causing the first wireless communication device to transmit, to the second wireless communication device, a second association request during the reserved time slot using the second tone.

The computer-readable medium further includes code for causing the first wireless communication device to receive, from the second wireless communication device, a second response to the second association request during the reserved time slot, and code for causing the first wireless communication device to transmit, to the second wireless communication device, association data comprising one or more tones available for selection as a connection identifier for data transmission. The computer-readable medium further includes code for causing the first wireless communication device to receive, from the second wireless communication device, an acknowledgment confirming a selected connection identifier from among the one or more tones in the association data, and code for causing the first wireless communication device to transmit, to the second wireless communication device, a data packet using the selected connection identifier during a second data frame. The computer-readable medium further includes code for causing the first wireless communication device to receive, from the second wireless communication device, a set of tones available to the second wireless communication device, the set of tones being different from the one or more tones available for selection as the connection identifier for data transmission, and code for causing the first wireless communication device to initiate a new association request comprising at least one tone that overlaps with at least one tone from among the set of tones. The computer-readable medium further includes code for causing the first wireless communication device to monitor one or more discovery broadcasts transmitted within a neighborhood of the first wireless communication device, code for causing the first wireless communication device to exclude occupied tones from the one or more monitored discovery broadcasts from the one or more tones in the association data. The computer-readable medium further includes code for causing the first wireless communication device to monitor one or more signaling blocks transmitted during the first data frame within a neighborhood of the first wireless communication device, and code for causing the first wireless communication device to exclude occupied tones from the one or more monitored signaling blocks from the one or more tones in the association data. The computer-readable medium further includes code for causing the first wireless communication device to receive a discovery broadcast comprising the first tone from the second wireless communication device. The computer-readable medium further includes code for causing the first wireless communication device to receive a plurality of discovery broadcasts corresponding to a plurality of wireless communication devices including the second wireless communication device, and code for causing the first wireless communication device to select the second wireless communication device as a potential relay device to transmit the first association request to from among the plurality of wireless communication devices in response to the receiving the plurality of discovery broadcasts. The computer-readable further includes wherein the first tone comprises a connection identifier used during a data transfer portion of the first data frame that is not in use during the reserved time slot, the data transfer portion occurring before the reserved time slot of the first data frame.

Embodiments of the present disclosure further include a computer-readable medium having program code recorded thereon, the program code comprising code for causing a first wireless communication device to receive, from a second wireless communication device, a first association request during a reserved time slot of a first data frame on a first tone available for an association request. The program code further comprises code for causing the first wireless communication device to transmit, to the second wireless communication device, a first response to the first association request during the reserved time slot. The program code further comprises code for causing the first wireless communication device to receive, from the second wireless communication device, a second association request during the reserved time slot using a second tone, wherein the second tone is randomly selected from among a plurality of tones.

The computer-readable medium further includes code for causing the first wireless communication device to transmit, to the second wireless communication device, a second response to the second association request during the reserved time slot, and code for causing the first wireless communication device to receive, from the second wireless communication device, association data comprising one or more available tones for selection as a connection identifier for data transmission with the second wireless communication device. The computer-readable medium further includes code for causing the first wireless communication device to monitor one or more broadcasts transmitted within a neighborhood of the first wireless communication device, and code for causing the first wireless communication device to compare the one or more available tones against any tones used in one or more broadcasts. The computer-readable medium further includes code for causing the first wireless communication device to accept a tone as a selected connection identifier from among the one or more available tones identified in the association data in response to the tone not matching any of the tones used in the one or more monitored broadcasts, code for causing the first wireless communication device to transmit, to the second wireless communication device, an acknowledgment confirming the selected connection identifier, and code for causing the first wireless communication device to receive, from the second wireless communication device, a data packet using the selected connection identifier. The computer-readable medium further includes code for causing the first wireless communication device to deny all of the tones from among the one or more available tones identified in the association data in response to the tone not matching any of the tones used in the one or more monitored broadcasts, code for causing the first wireless communication device to generate, based on a result of the comparing, a set of tones available to the first wireless communication device, the set of tones being different from the one or more available tones identified in the association data, code for causing the first wireless communication device to transmit, to the second wireless communication device, the generated set of tones, and code for causing the first wireless communication device to receive, from the second wireless communication device, a new association request comprising at least one tone that overlaps with at least one tone from among the set of tones. The computer-readable medium further includes wherein the monitored one or more broadcasts comprise discovery broadcasts. The computer-readable medium further includes wherein the monitored one or more broadcasts comprise signaling blocks transmitted during the first data frame. The computer-readable medium further includes code for causing the first wireless communication device to include one or more tones that can be used for the association request, including the first tone, in a discovery broadcast, and code for causing the first wireless communication device to broadcast the discovery broadcast comprising the one or more tones. The computer-readable medium further includes wherein the first tone comprises a connection identifier used with the first wireless communication device during a data transfer portion of the first data frame that is not in use during the reserved time slot, the data transfer portion occurring before the reserved time slot of the first data frame. The computer-readable medium further includes code for causing the first wireless communication device to monitor one or more broadcasts within during a discovery frame to identify one or more tones used with the one or more broadcasts with a neighborhood of the first wireless communication device, and code for causing the first wireless communication device to select the one or more tones including the first tone, the one or more selected tones being other than the one or more tones identified from the monitoring. The computer-readable medium further includes wherein the code for causing the first wireless communication device to receive the first association request comprises code for causing the first wireless communication device to receive a plurality of first association requests from a plurality of second wireless communication devices. The computer-readable medium further includes wherein the code for causing the first wireless communication device to transmit the first response comprises code for causing the first wireless communication device to transmit a plurality of first responses to the plurality of second wireless communication devices. The computer-readable medium further includes wherein the code for causing the first wireless communication device to receive the second association request using the second tone comprises code for causing the first wireless communication device to receive a plurality of second association requests, each using a randomly selected tone from among the plurality of tones. The computer-readable medium further includes code for causing the first wireless communication device to select the second tone used by the second wireless communication device from among the plurality of second wireless communication devices, and code for causing the first wireless communication device to transmit, to the selected second wireless communication device, a second response to the second association request during the reserved time slot.

Embodiments of the present disclosure further include an apparatus comprising means for transmitting, from the apparatus to a wireless communication device, a first association request during a reserved time slot of a first data frame using a first tone available for an association request. The apparatus further comprises means for randomly selecting, by the apparatus, a second tone from among a plurality of available tones based on a first response from the wireless communication device to the first association request during the reserved time slot. The apparatus further comprises means for transmitting, to the wireless communication device, a second association request during the reserved time slot using the second tone.

The apparatus further includes means for receiving, from the wireless communication device, a second response to the second association request during the reserved time slot, and means for transmitting, from the apparatus to the wireless communication device, association data comprising one or more tones available for selection as a connection identifier for data transmission. The apparatus further includes means for receiving, from the wireless communication device, an acknowledgment confirming a selected connection identifier from among the one or more tones in the association data, and means for transmitting, from the apparatus to the wireless communication device, a data packet using the selected connection identifier during a second data frame. The apparatus further includes means for receiving, from the wireless communication device, a set of tones available to the wireless communication device, the set of tones being different from the one or more tones available for selection as the connection identifier for data transmission, and means for initiating, by the apparatus, a new association request comprising at least one tone that overlaps with at least one tone from among the set of tones. The apparatus further includes means for monitoring, by the apparatus, one or more discovery broadcasts transmitted within a neighborhood of the apparatus, and means for excluding, by the apparatus, occupied tones from the one or more monitored discovery broadcasts from the one or more tones in the association data. The apparatus further includes means for monitoring, by the apparatus, one or more signaling blocks transmitted during the first data frame within a neighborhood of the apparatus, and means for excluding, by the apparatus, occupied tones from the one or more monitored signaling blocks from the one or more tones in the association data. The apparatus further includes means for receiving, at the apparatus, a discovery broadcast comprising the first tone from the wireless communication device. The apparatus further includes means for receiving, at the apparatus, a plurality of discovery broadcasts corresponding to a plurality of wireless communication devices including the wireless communication device, and selecting, by the apparatus, the wireless communication device as a potential relay device to transmit the first association request to from among the plurality of wireless communication devices in response to the receiving the plurality of discovery broadcasts. The apparatus further includes wherein the first tone comprises a connection identifier used during a data transfer portion of the first data frame that is not in use during the reserved time slot, the data transfer portion occurring before the reserved time slot of the first data frame. The apparatus further includes wherein the apparatus comprises an internet of everything (IoE) device, and the wireless communication device comprises a relay device.

Embodiments of the present disclosure further include an apparatus comprising means for receiving, at the apparatus from a wireless communication device, a first association request during a reserved time slot of a first data frame on a first tone available for an association request. The apparatus further comprises means for transmitting, from the apparatus to the wireless communication device, a first response to the first association request during the reserved time slot. The apparatus further comprises means for receiving, at the apparatus from the wireless communication device, a second association request during the reserved time slot using a second tone, wherein the second tone is randomly selected from among a plurality of tones.

The apparatus further includes means for transmitting, from the apparatus to the wireless communication device, a second response to the second association request during the reserved time slot, and means for receiving, at the apparatus from the wireless communication device, association data comprising one or more available tones for selection as a connection identifier for data transmission with the wireless communication device. The apparatus further includes means for monitoring, by the apparatus, one or more broadcasts transmitted within a neighborhood of the apparatus, and means for comparing, by the apparatus, the one or more available tones against any tones used in one or more broadcasts. The apparatus further includes means for accepting, by the apparatus, a tone as a selected connection identifier from among the one or more available tones identified in the association data in response to the tone not matching any of the tones used in the one or more monitored broadcasts, means for transmitting, from the apparatus to the wireless communication device, an acknowledgment confirming the selected connection identifier, and means for receiving, at the apparatus from the wireless communication device, a data packet using the selected connection identifier. The apparatus further includes means for denying, by the apparatus, all of the tones from among the one or more available tones identified in the association data in response to the tone not matching any of the tones used in the one or more monitored broadcasts, means for generating, based on a result of the comparing, a set of tones available to the apparatus, the set of tones being different from the one or more available tones identified in the association data, means for transmitting, from the apparatus to the wireless communication device, the generated set of tones, and means for receiving, at the apparatus from the wireless communication device, a new association request comprising at least one tone that overlaps with at least one tone from among the set of tones. The apparatus further includes wherein the monitored one or more broadcasts comprise discovery broadcasts. The apparatus further includes wherein the monitored one or more broadcasts comprise signaling blocks transmitted during the first data frame, The apparatus further includes means for including, by the apparatus, one or more tones that can be used for the association request, including the first tone, in a discovery broadcast, and means for broadcasting, by the apparatus, the discovery broadcast comprising the one or more tones. The apparatus further includes wherein the first tone comprises a connection identifier used with the apparatus during a data transfer portion of the first data frame that is not in use during the reserved time slot, the data transfer portion occurring before the reserved time slot of the first data frame. The apparatus further includes means for monitoring, by the apparatus, one or more broadcasts within during a discovery frame to identify one or more tones used with the one or more broadcasts with a neighborhood of the apparatus, and means for selecting, by the apparatus, the one or more tones including the first tone, the one or more selected tones being other than the one or more tones identified from the monitoring. The apparatus further includes wherein the means for receiving the first association request comprises means for receiving a plurality of first association requests from a plurality of wireless communication devices. The apparatus further includes wherein the means for transmitting the first response comprises means for transmitting a plurality of first responses to the plurality of wireless communication devices. The apparatus further includes the means for receiving the second association request using the second tone comprises means for receiving a plurality of second association requests, each using a randomly selected tone from among the plurality of tones. The apparatus further comprises means for selecting, by the apparatus, the second tone used by the wireless communication device from among the plurality of wireless communication devices, and means for transmitting, from the apparatus to the selected wireless communication device, a second response to the second association request during the reserved time slot. The apparatus further comprises wherein the apparatus comprises a relay device, and the wireless communication device comprises an internet of everything (IoE) device.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method, comprising:
   receiving, at a first wireless communication device, a discovery broadcast comprising a first tone from a second wireless communication device;
   transmitting, from the first wireless communication device to the second wireless communication device, a first association request during a reserved time slot of a data frame using the first tone available for an association request;
   selecting, at the first wireless communication device, a second tone based on a first response from the second wireless communication device to the first association request during the reserved time slot; and
   transmitting, from the first wireless communications device to the second wireless communication device, a second association request during the reserved time slot of the data frame using the second tone.

2. The method of claim 1, further comprising:
   receiving, from the second wireless communication device, a second response to the second association request during the reserved time slot of the data frame; and transmitting, from the first wireless communication device to the second wireless communication device, association data comprising one or more tones available for selection as a connection identifier for data transmission.

3. The method of claim 1, further comprising:
receiving, from the second wireless communication device, an acknowledgment confirming a selected connection identifier from among one or more tones identified in association data; and
transmitting, from the first wireless communication device to the second wireless communication device, a data packet using the selected connection identifier.

4. The method of claim 1, further comprising:
receiving, from the second wireless communication device, a set of tones available to the second wireless communication device that are different from one or more tones available for selection at the first wireless communications device as a connection identifier for data transmission; and
initiating, by the first wireless communication device, a new association request comprising at least one tone that overlaps with at least one tone from among the set of tones.

5. The method of claim 1, further comprising:
monitoring, by the first wireless communication device, one or more discovery broadcasts transmitted within a neighborhood of the first wireless communication device; and
excluding, by the first wireless communication device, occupied tones from the one or more monitored discovery broadcasts from one or more tones identified in association data as available for selection as a connection identifier for data transmission.

6. The method of claim 1, wherein:
the first tone comprises a connection identifier used during a data transfer portion of the data frame that is not in use during the reserved time slot, the data transfer portion occurring before the reserved time slot of the data frame, and
the second tone is randomly selected from among a plurality of available tones.

7. A method, comprising:
including, by a first wireless communication device, one or more tones that can be used for a first association request, including a first tone, in a discovery broadcast;
broadcasting, by the first wireless communication device, the discovery broadcast comprising the one or more tones;
receiving, at the first wireless communication device from a second wireless communication device, the first association request during a reserved time slot of a data frame on the first tone available for an association request;
transmitting, from the first wireless communication device to the second wireless communication device, a first response to the first association request during the reserved time slot of the data frame; and
receiving, at the first wireless communication device from the second wireless communication device, a second association request during the reserved time slot of the data frame using a second tone.

8. The method of claim 7, further comprising:
transmitting, from the first wireless communication device to the second wireless communication device, a second response to the second association request during the reserved time slot of the data frame; and
receiving, at the first wireless communication device from the second wireless communication device, association data comprising one or more available tones for selection as a connection identifier for data transmission with the second wireless communication device.

9. The method of claim 8, further comprising:
monitoring, by the first wireless communication device, one or more broadcasts transmitted within a neighborhood of the first wireless communication device; and
comparing, by the first wireless communication device, one or more available tones identified for selection as a connection identifier against any tones used in one or more of the monitored broadcasts.

10. The method of claim 9, further comprising:
accepting, by the first wireless communication device, a tone as a selected connection identifier from among the one or more available tones in response to the tone not matching any of the tones used in the one or more monitored broadcasts;
transmitting, from the first wireless communication device to the second wireless communication device, an acknowledgment confirming the selected connection identifier; and
receiving, at the first wireless communication device from the second wireless communication device, a data packet using the selected connection identifier.

11. The method of claim 9, further comprising:
denying, by the first wireless communication device, all of the tones from among the one or more available tones identified in the association data in response to the tone matching any of the tones used in the one or more monitored broadcasts;
generating, based on a result of the comparing, a set of tones available to the first wireless communication device, the set of tones being different from the one or more available tones;
transmitting, from the first wireless communication device to the second wireless communication device, the generated set of tones; and
receiving, at the first wireless communication device from the second wireless communication device, an association request comprising at least one tone that overlaps with at least one tone from among the set of tones.

12. The method of claim 7, wherein:
the first tone comprises a connection identifier used with the first wireless communication device during a data transfer portion of the data frame that is not in use during the reserved time slot, the data transfer portion occurring before the reserved time slot of the data frame, and
the second tone is randomly selected from among a plurality of tones.

13. The method of claim 7, wherein:
the receiving the first association request comprises receiving a plurality of first association requests from a plurality of second wireless communication devices,
the transmitting the first response comprises transmitting a plurality of first responses to the plurality of second wireless communication devices, and
the receiving the second association request using the second tone comprises receiving a plurality of second association requests, each using a randomly selected tone from among a plurality of tones, the method further comprising:
selecting, by the first wireless communication device, the second tone used by the second wireless communication device from among the plurality of second wireless communication devices; and transmitting, from the first wireless communication device to the selected second wireless communication device, a second response to the second association request during the reserved time slot of the data frame.

14. An apparatus, comprising:
a transceiver configured to:
receive a discovery broadcast comprising a first tone from a wireless communication device; and
transmit, to the wireless communication device, a first association request during a reserved time slot of a data frame using the first tone available for an association request; and
a processor configured to select a second tone based on a first response from the wireless communications device to the first association request during the reserved time slot of the data frame,
wherein the transceiver is further configured to transmit, to the wireless communication device, a second association request during the reserved time slot of the data frame using the second tone.

15. The apparatus of claim 14, wherein the transceiver is further configured to:
receive, from the wireless communication device, a second response to the second association request during the reserved time slot of the data frame; and
transmit, to the wireless communication device, association data comprising one or more tones available for selection as a connection identifier for data transmission.

16. The apparatus of claim 14, wherein the transceiver is further configured to:
receive, from the wireless communication device, an acknowledgment confirming a selected connection identifier from among one or more tones identified in association data; and
transmit a data packet to the wireless communication device using the selected connection identifier.

17. The apparatus of claim 14, wherein:
the transceiver is further configured to receive, from the wireless communication device, a set of tones available to the wireless communication device that are different from one or more tones available for selection by the processor as a connection identifier for data transmission; and
the processor is further configured to initiate a new association request comprising at least one tone that overlaps with at least one tone from among the set of tones.

18. The apparatus of claim 14, wherein:
the transceiver is further configured to monitor one or more discovery broadcasts transmitted within a neighborhood of the apparatus; and
the processor is further configured to exclude occupied tones from the one or more monitored discovery broadcasts from one or more tones identified in association data as available for selection as a connection identifier for data transmission.

19. The apparatus of claim 14, wherein:
the first tone comprises a connection identifier used during a data transfer portion of the data frame that is not in use during the reserved time slot, the data transfer portion occurring before the reserved time slot of the data frame, the first response comprises a plurality of available tones, and
the second tone is randomly selected from among the plurality of available tones.

20. The apparatus of claim 14, wherein:
the apparatus comprises an internet of everything (IoE) device; and
the wireless communication device comprises a relay device.

21. An apparatus, comprising:
a processor configured to include one or more tones that can be used for an association request, including a first tone, in a discovery broadcast; and
a transceiver configured to:
broadcast the discovery broadcast comprising the one or more tones; and
receive, from a wireless communication device, a first association request during a reserved time slot of a data frame on the first tone available for the association request,
wherein the processor is further configured to generate a first response to the first association request during the reserved time slot of the data frame, and
wherein the transceiver is further configured to transmit the first response to the wireless communication device and receive, from the wireless communication device, a second association request during the reserved time slot of the data frame using a second tone.

22. The apparatus of claim 21, wherein the transceiver is further configured to:
transmit, to the wireless communication device, a second response to the second association request during the reserved time slot of the data frame; and
receive, from the wireless communication device, association data comprising one or more available tones for selection as a connection identifier for data transmission with the wireless communication device.

23. The apparatus of claim 22, wherein:
the transceiver is further configured to monitor one or more broadcasts transmitted within a neighborhood of the apparatus; and
the processor is further configured to compare one or more available tones identified for selection as a connection identifier against any tones used in one or more of the monitored broadcasts.

24. The apparatus of claim 23, wherein:
the processor is further configured to accept a tone as a selected connection identifier from among the one or more available tones in response to the tone not matching any of the tones used in the one or more monitored broadcasts, and
the transceiver is further configured to:
transmit, to the wireless communication device, an acknowledgment confirming the selected connection identifier; and
receive, from the wireless communication device, a data packet using the selected connection identifier.

25. The apparatus of claim 23, wherein:
the processor is further configured to:
deny all of the tones from among the one or more available tones identified in the association data in response to the tone not matching any of the tones used in the one or more monitored broadcasts; and
generate, based on a result of the comparing, a set of tones available to the apparatus, the set of tones being different from the one or more available tones; and the transceiver is further configured to:
    transmit, to the wireless communication device, the generated set of tones; and
    receive, from the wireless communication device, an association request comprising at least one tone that overlaps with at least one tone from among the set of tones.

26. The apparatus of claim 21, wherein:
the first tone comprises a connection identifier used with the apparatus during a data transfer portion of the data frame that is not in use during the reserved time slot, the data transfer portion occurring before the reserved time slot of the data frame,
the second tone is randomly selected from among a plurality of tones, and
the apparatus comprises a relay device and the wireless communication device comprises an internet of everything (IoE) device.

27. The apparatus of claim 21, wherein:
the receiving the first association request comprises receiving a plurality of first association requests from a plurality of wireless communication devices,
the transmitting the first response comprises transmitting a plurality of first responses to the plurality of wireless communication devices,
the receiving the second association request using the second tone comprises receiving a plurality of second association requests, each using a randomly selected tone from among a plurality of tones,
the processor is configured to select the second tone used by the wireless communication device from among the plurality of wireless communication devices, and
the transceiver is further configured to transmit, to the selected wireless communication device, a second response to the second association request during the reserved time slot of the data frame.

* * * * *